US012776243B2

(12) United States Patent
Park et al.

(10) Patent No.: US 12,776,243 B2
(45) Date of Patent: Oct. 27, 2026

(54) SOURCE DRIVER INCLUDING A REPAIR CHANNEL, AND DISPLAY DRIVING CIRCUIT INCLUDING THE SOURCE DRIVER

(71) Applicant: Samsung Electronics Co., Ltd., Suwon-si (KR)

(72) Inventors: Keunhwa Park, Suwon-si (KR); Jihoon Kim, Suwon-si (KR); Daehyun Moon, Suwon-si (KR); Youngbae Moon, Suwon-si (KR); Seunguk Baek, Suwon-si (KR); Yunseok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/077,824

(22) Filed: Mar. 12, 2025

(65) Prior Publication Data

US 2025/0308430 A1 Oct. 2, 2025

(30) Foreign Application Priority Data

Mar. 27, 2024 (KR) ........................ 10-2024-0042011
Jul. 15, 2024 (KR) ........................ 10-2024-0093330

(51) Int. Cl.
*G09G 3/20* (2006.01)

(52) U.S. Cl.
CPC ... *G09G 3/2092* (2013.01); *G09G 2310/0267* (2013.01); *G09G 2310/027* (2013.01); *G09G 2310/0275* (2013.01); *G09G 2310/0289* (2013.01); *G09G 2310/0291* (2013.01); *G09G 2330/08* (2013.01)

(58) Field of Classification Search
None
See application file for complete search history.

(56) References Cited

U.S. PATENT DOCUMENTS

| | | | | |
|---|---|---|---|---|
| 5,926,156 | A * | 7/1999 | Katoh | G09G 3/3688 345/55 |
| 8,416,171 | B2 | 4/2013 | Murahashi et al. | |
| 8,587,573 | B2 | 11/2013 | Watanabe et al. | |
| 10,410,582 | B2 | 9/2019 | Lee et al. | |
| 11,657,742 | B1 | 5/2023 | Akyol et al. | |
| 11,721,262 | B2 | 8/2023 | Eom et al. | |
| 2011/0199355 | A1* | 8/2011 | Watanabe | G09G 3/3688 345/211 |

(Continued)

*Primary Examiner* — Kirk W Hermann
(74) *Attorney, Agent, or Firm* — Fish & Richardson P.C.

(57) ABSTRACT

A source driver includes a plurality of driving channels configured to generate a plurality of pixel signals respectively provided to a plurality of source lines of a display panel and, each of the plurality of driving channels including a first circuit and a second circuit, the first circuit being configured to generate a first signal based on received pixel data, and the second circuit being configured to generate a pixel signal, based on the first signal, a repair channel including the first circuit and the second circuit, and a switching circuit configured to change a plurality of signal transmission paths of the plurality of driving channels and an internal signal transmission path of the repair channel so as to repair the first circuit of a defected driving channel in which a defect has occurred among the plurality of driving channels by using the first circuit of the repair channel.

20 Claims, 19 Drawing Sheets

(56) References Cited

U.S. PATENT DOCUMENTS

| | | | | |
|---|---|---|---|---|
| 2014/0043375 | A1* | 2/2014 | Hu | G09G 3/36 345/204 |
| 2016/0140935 | A1 | 5/2016 | Hwang et al. | |
| 2017/0092202 | A1* | 3/2017 | Jeong | G09G 3/2003 |
| 2018/0061335 | A1* | 3/2018 | Fujita | G09G 3/3291 |
| 2019/0088183 | A1* | 3/2019 | Jeong | H03F 3/303 |
| 2022/0383790 | A1* | 12/2022 | Eom | G09G 3/20 |
| 2023/0057575 | A1 | 2/2023 | Kim et al. | |
| 2023/0081076 | A1* | 3/2023 | Lim | G09G 3/3688 345/212 |

* cited by examiner

SOURCE DRIVER INCLUDING A REPAIR CHANNEL, AND DISPLAY DRIVING CIRCUIT INCLUDING THE SOURCE DRIVER

CROSS-REFERENCE TO RELATED APPLICATION

This application is based on and claims priority under 35 U.S.C. § 119 to Korean Patent Application Nos. 10-2024-0042011 filed on Mar. 27, 2024, and 10-2024-0093330 filed on Jul. 15, 2024, in the Korean Intellectual Property Office, the disclosures of which are incorporated by reference herein in their entireties.

BACKGROUND

Some example embodiments relate to a semiconductor device, and more particularly to, a source driver to which a repair technique is applied to a driving channel in which a defect has occurred and a display driving circuit including the source driver.

A display device includes a display panel displaying an image and a display driving circuit driving the display panel. The display driving circuit may receive image data from the outside and drive the display panel by applying image signals corresponding to the received image data to source lines of the display panel, respectively, through each of a plurality of driving channels provided in a source driver. When a defect, such as a short circuit and/or an open circuit, occurs in at least one of the plurality of driving channels of the source driver, an abnormal signal is applied to pixels connected to a source line of the display panel receiving the image signal from the driving channel in which the defect has occurred. The defect may cause a vertical line defect to occur in the image displayed on the display panel. Therefore, when a defect occurs in at least one of the plurality of driving channels of the source driver, it is necessary or desirable to prevent or reduce the likelihood of and/or the impact from a vertical line defect by replacing the driving channel in which the defect has occurred by using a repair channel.

SUMMARY

Some example embodiments may provide a source driver capable of repairing a driving channel in which a defect has occurred when the defect occurs at least one of a plurality of driving channels of the source driver, and a display driving circuit including the source driver.

According to some example embodiments, there is provided a source driver comprising a plurality of driving channels configured to generate a plurality of pixel signals respectively provided to a plurality of source lines of a display panel, each of the plurality of driving channels comprising a first circuit and a second circuit, the first circuit configured to generate a first signal based on received pixel data, and the second circuit configured to generate a pixel signal, based on the first signal, a repair channel comprising another first circuit and another second circuit, and a switching circuit configured to change a plurality of signal transmission paths of the plurality of driving channels and to change an internal signal transmission path of the repair channel so as to repair the first circuit of a defected driving channel among the plurality of driving channels, the defected driving channel being a channel in which a defect has occurred, the repair by using the first circuit of the repair channel, the changing being in response to the defect occurring in one of the plurality of driving channels.

Alternatively or additionally, according to some example embodiments, there is provided a source driver comprising a plurality of driving channels each comprising a digital-to-analog conversion (DAC) circuit and an output buffer and configured to generate a plurality of data signals in a plurality of source lines of a display panel, a repair channel comprising another DAC circuit and another output buffer, and a switching circuit configured to connect the plurality of driving channels to the repair channel such that, in response to a defect occurring in one of the plurality of driving channels, a plurality of grayscale voltages generated in driving channels other than a defected driving channel in which the defect has occurred and the repair channel are output as pixel signals through a plurality of output buffers of the plurality of driving channels.

Alternatively or additionally, according to some example embodiments, there is provided a display driving circuit configured to drive a display panel, the display driving circuit comprising a source driver configured to generate a plurality of pixel signals based on image data, and to provide the plurality of pixel signals to a plurality of source lines of the display panel, and a gate driver configured to sequentially select a plurality of rows of the display panel by sequentially providing gate-on signals to a plurality of gate lines of the display panel. The source driver comprises a plurality of driving channels each comprising a digital-to-analog conversion (DAC) circuit and an output buffer, the plurality of driving channels configured to generate the plurality of pixel signals, a repair channel on one side of the plurality of driving channels and comprising a DAC circuit and the output buffer, and a switching circuit comprising a plurality of switches between the DAC circuit and the output buffer of the plurality of driving channels and the repair channel, and configured to perform a repair operation on a defected driving channel in which a defect has occurred among the plurality of driving channels, the repair operation based on the repair channel, the repair operation according to a turn-on operation of at least one repair mode switch among the plurality of switches and a turn-off operation of at least one normal mode switch among the plurality of switches.

BRIEF DESCRIPTION OF THE DRAWINGS

Some example embodiments will be more clearly understood from the following detailed description taken in conjunction with the accompanying drawings in which.

DETAILED DESCRIPTION OF SOME EXAMPLE EMBODIMENTS

Hereinafter, various example embodiments are described in connection with the accompanying drawing.

Figure 1A:
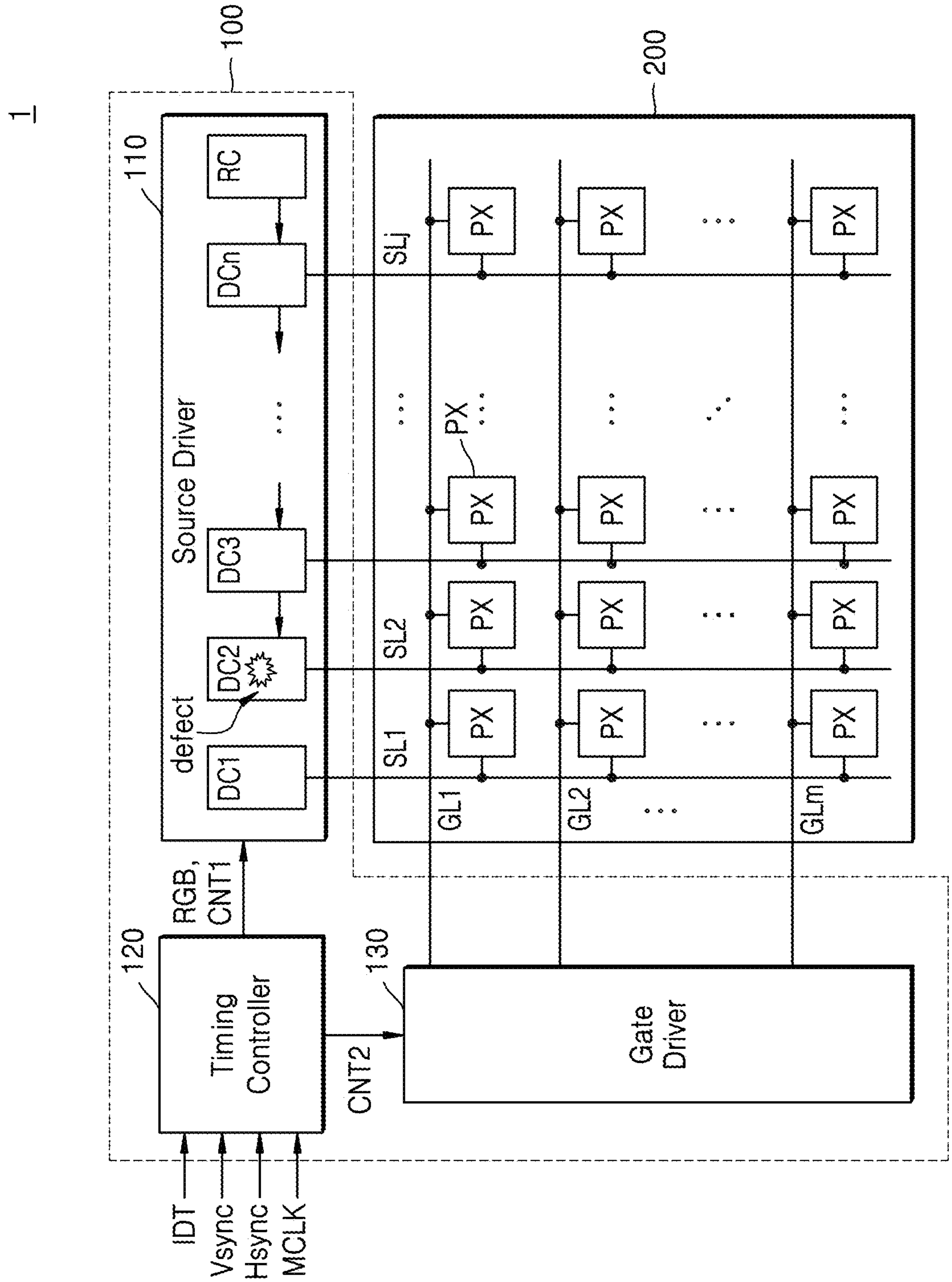
FIGS. 1A and 1B are block diagrams illustrating a display device according to some example embodiments.
Figure 1B:
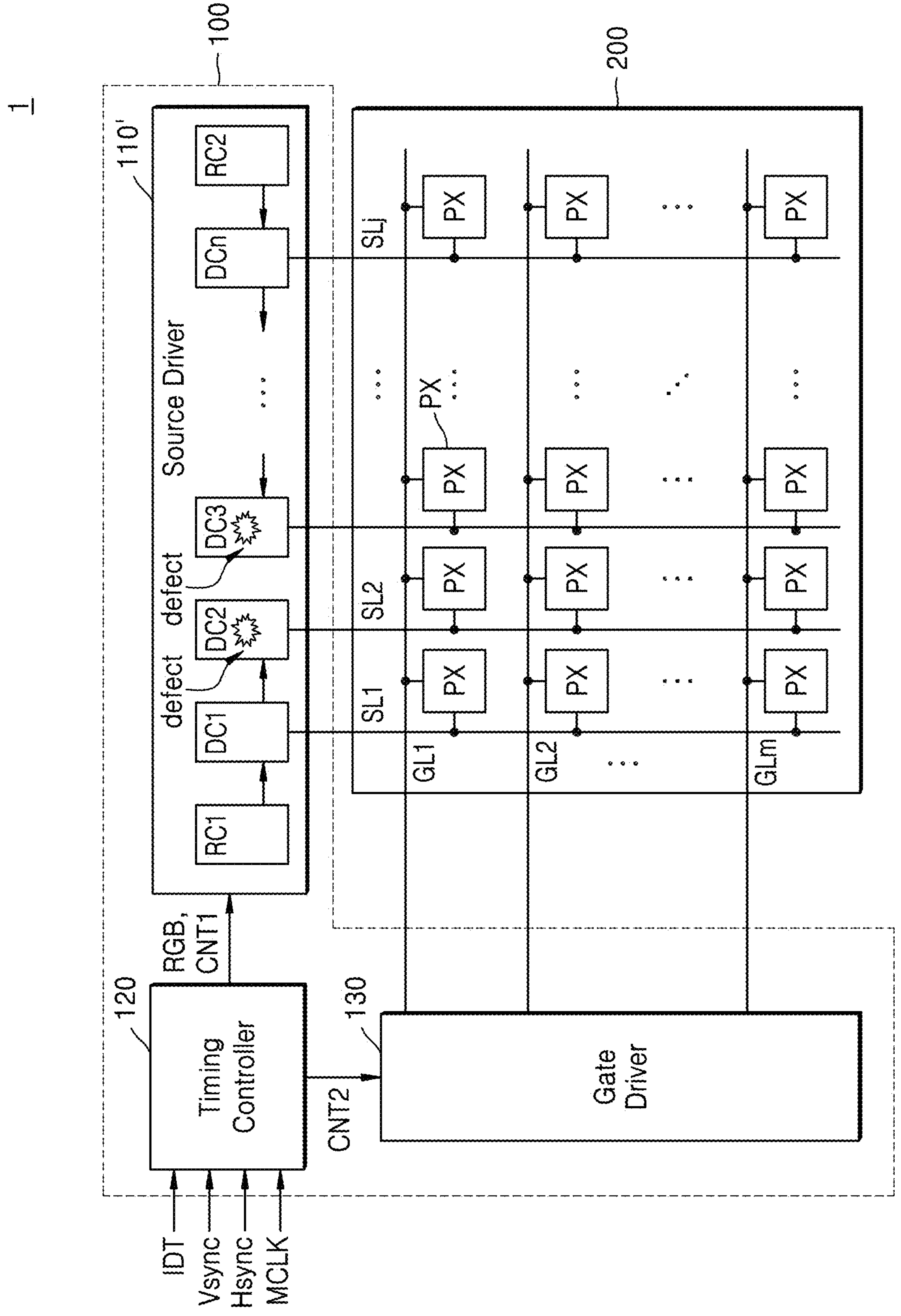

FIGS. 1A and 1B are block diagrams illustrating a display device 1 according to some example embodiments.

The display device 1 according to some example embodiments may be mounted on an electronic device having an image display function. For example, the electronic device may include or be included in one or more of a smartphone, a tablet personal computer (PC), a portable multimedia player (PMP), a camera, a wearable device, a television, a digital video disk (DVD) player, a refrigerator, an air conditioner, an air purifier, a set-top box, a robot, a drone, various medical devices, a navigation device, a global positioning system (GPS) receiver, a vehicle device, furniture, or various measuring devices.

Referring to FIG. 1A, the display device 1 includes a display panel 200 displaying an image and a display driving circuit 100 (or referred to as a display driving integrated circuit (DDI)) driving the display panel 200.

In some example embodiments, the display driving circuit 100 and the display panel 200 may be implemented as a single module. For example, the display driving circuit 100 may be mounted on a substrate of the display panel 200, and/or the display driving circuit 100 and the display panel 200 may be electrically connected to each other through a connection member such as a flexible printed circuits board (FPCB).

The display panel 200 is or includes a display unit on which an actual image is displayed, and may be or include one or more of display devices that receives an electrically transmitted image signal and displays a two-dimensional (2D) image such as an organic light emitting diode (OLED) display, a thin film transistor-liquid crystal display (TFT-LCD), a field emission display, or a plasma display panel (PDP).

The display panel 200 includes a plurality of gate lines GL1 to GLm (m is an integer of 2 or more), a plurality of source lines SL1 to SLj (j is an integer of 2 or more that may be greater than, less than, or equal to m) disposed in a direction crossing the gate lines GL1 to GLm, and a plurality of pixels PX arranged in a region where the gate lines GL1 to GLm and the source lines SL1 to SLj intersect.

Each of the plurality of pixels PX may include a light emitting device and may output light of a particular color such as of a preset color. Each of the plurality of pixels PX may output a light signal of an intensity corresponding to a grayscale level indicated by a pixel signal provided through a corresponding source line among the plurality of source lines SL1 to SLj.

Two or more pixels PX (e.g., red, blue, and green pixels) that are disposed adjacent to each other on the same or adjacent line and output light of different colors among the plurality of pixels PX may constitute one unit pixel. At this time, the two or more pixels PX constituting the unit pixel may be referred to as subpixels. In some example embodiments, the display panel 200 may have an RGB structure in which red, green, and blue pixels constitute one unit pixel. In some example embodiments, the RGB structure may be arranged as a Bayer structure; however, the display panel 200 is not limited thereto, and may have an RGBW structure in which the unit pixel further or alternatively includes a white pixel for luminance improvement, and/or an RGBG structure (or referred to as a pentile structure) in which the unit pixel includes one red pixel, one blue pixel, and two green pixels. Alternatively or additionally, the unit pixel of display panel 200 may have a combination of pixels of colors other than red, green, and blue.

The display driving circuit 100 may include a timing controller 120, a source driver 110, and a gate driver 130. The display driving circuit 100 may further include other components, such as one or more of an interface circuit receiving image data IDT and control signals, a voltage generation circuit generating voltages used by the display driving circuit 100, a grayscale voltage generation circuit generating a plurality of grayscale voltages, and intellective property (IP) circuits performing image processing of the image data IDT.

In some example embodiments, the timing controller 120, the source driver 110, and the gate driver 130 may be formed on and/or in one or more semiconductor chips. In some example embodiments, the timing controller 120 and the source driver 110 may be formed on and/or in one or more semiconductors, and the gate driver 130 may be formed on and/or in the display panel 200.

The timing controller 120 may control some or all, such as the overall operation of the display driving circuit 100 and may control components of the display driving circuit 100 such as the source driver 110 and the gate driver 130 such that the received image data IDT is displayed on the display panel 200.

The timing controller 120 may receive the image data IDT and a control signal, e.g., from the outside. The control signal may receive, for example, a vertical synchronization signal Vsync, a horizontal synchronization signal Hsync, and a clock signal MCLK. In some example embodiments, the timing controller 120 may internally generate the vertical synchronization signal Vsync and the horizontal synchronization signal Hsync based on the clock signal MCLK. Here, the vertical synchronization signal Vsync indicates a frame period in which the image data IDT of one frame is displayed on the display panel 200, and the horizontal synchronization signal Hsync indicates a horizontal period in which one row of the display panel 200 is driven (e.g., a pixel signal is provided to one row).

The timing controller 120 may convert and/or processes the format of the image data IDT according to the interface specification with the source driver 110, and/or may decode the image data IDT to generate converted image data, and may output the converted image data to the source driver 110 in units of row data RGB corresponding to one row of the display panel 200. Alternatively or additionally, the timing controller 120 may generate various control signals to control the timing of the source driver 110 and the gate driver 130, may output one or more first control signals CNT1 to the source driver 110, and one or more second control signals CNT2 to the gate driver 130.

In some example embodiments, the timing controller 120 may be implemented as hardware, software, or a combination of software (or firmware) and hardware. For example, the timing controller 120 may be implemented as hardware logic, as various hardware logic such as one or more of an application specific IC (ASIC), a field programmable gate array (FPGA), or a complex programmable logic device (CPLD), or as firmware, software, or a combination of a hardware device and software running on a processor such as a micro controller unit (MCU) or a control processing unit (CPU).

The source driver 110 may convert the row data RGB received from the timing controller 120 into a plurality of pixel signals and respectively provide the plurality of pixel signals to the plurality of source lines SL1 to SLj. In the inventive concept, the pixel signal may be referred to as an image signal, a data signal, or a grayscale voltage.

The source driver 110 may include a plurality of driving channels DC1 to DCn (n is an integer of 2 or more, that may be greater than, less than, or equal to m and/or j, e.g., may be in correspondence with j), may convert pixel data received by each of the plurality of driving channels DC1 to DCn into a pixel signal, and may provide the pixel signal to a corresponding source line among the plurality of source lines SL1 to SLj. In some example embodiments, as shown in FIG. 1A, the number of the plurality of source lines SL1 to SLj may be the same as the number of the plurality of driving channels DC1 to DCn (j=n), and each of the plurality of driving channels DC1 to DCn may be connected to one of the source lines SL1 to SLj to provide the pixel signal to the connected one of the source lines SL1 to SLj in one horizontal period. In some example embodiments, the number of the plurality of source lines SL1 to SLj may be a multiple, e.g., an integer multiple, times the number of the plurality of driving channels DC1 to DCn (j=2n, 3n, 4n, . . . ), and each of the plurality of driving channels DC1 to DCn may be time-divisionally connected to two or more of the source lines SL1 to SLj in one horizontal period. Each of the plurality of driving channels DC1 to DCn may time-divisionally provide two or more pixel signals to two or more of the source lines SL1 to SLj in one horizontal period. Hereinafter, in some example embodiments, it may be assumed that the number of the plurality of source lines SL1 to SLj is the same as the number of the plurality of driving channels DC1 to DCn (j=n).

The source driver 110 may further include at least one redundant channel and/or repair channel RC. In some example embodiments, the repair channel RC may be disposed on one side of the plurality of driving channels DC1 to DCn. The repair channel RC may be used to replace a driving channel in which a defect has occurred when the defect occurs in at least one of the plurality of driving channels DC1 to DCn. Hereinafter, the driving channel in which the defect has occurred may be referred to as a defected driving channel and/or as a defective driving channel. For example, when a defect occurs inside the circuit of a second driving channel DC2, a third driving channel DC3 adjacent (located next) to the second driving channel DC2 may replace the second driving channel DC2, and the third driving channel DC3 may be replaced by a fourth driving channel (not shown) adjacent to the third driving channel DC3. Such a replacement structure may be repeated such that even the repair channel RC, which is or normally is a dummy channel and is not used during operation of the source driver 110, may be used. According to a repair technique according to some example embodiments, a defected driving channel may be repaired by using the repair channel RC.

In some example embodiments, the defected driving channel may include a defect, such as one or more of an open circuit (e.g., a broken metal line) and/or a short circuit (e.g., a soft metal short). Example embodiments are not limited thereto. For example some defected driving channels may include a defect caused by electromigration; example embodiments are not limited thereto.

According to the repair technique according to some example embodiments, each of the plurality of driving channels DC1 to DCn and the repair channel RC may include an output buffer (OBUF of FIG. 2) that outputs a pixel signal, and a repair operation may be performed before an output stage of the output buffer of each of the plurality of driving channels DC1 to DCn and the repair channel RC. For example, the repair operation may include a switching operation of changing a signal transmission path of the plurality of driving channels DC1 to DCn and the repair channel RC, and a switching operation may be performed between an input stage and the output stage of the output buffer OBUF, between the input stage of the output buffer OBUF and a digital-to-analog conversion (DAC) circuit (DA of FIG. 2), and/or between the DAC circuit DA and a level shifter (LS of FIG. 2).

Circuits (hereinafter, referred to as first circuits) disposed before the output stage of the output buffer OBUF of the defected driving channel (e.g., the second driving channel DC2) may be replaced by the first circuit of a driving channel (e.g., the third driving channel DC3) located next to the driving channel in which the defect has occurred, and such a replacement structure may be repeated such that even the first circuit of the repair channel RC may be used.

For example, when a defect occurs inside the circuit of the second driving channel DC2, an intermediate signal (hereinafter referred to as a first signal) generated in the first circuit of each of the third to nth driving channels DC3 to DCn and the repair channel RC may be provided to a second circuit of each of the second to nth driving channels DC2 to DCn. Here, the second circuit indicates the remaining circuit except for the first circuit in each of the plurality of driving channels DC1 to DCn and the repair channel RC, and includes the output stage of the output buffer OBUF. The second circuit of each of the second to nth driving channels DC2 to DCn may output a pixel signal generated based on the received first signal to a corresponding source line.

The second circuit of the defective second driving channel DC2 may generate a pixel signal based on the first signal received from the first circuit of the adjacent third driving channel DC3, and output the pixel signal to a second source line SL2. The second circuit of the third driving channel DC3 may generate a pixel signal based on the first signal received from the first circuit of the adjacent fourth driving channel DC4 and output the pixel signal to a third source line SL3. As described above, the first signal generated in each of the third to nth driving channels DC3 to DCn may be provided to an adjacent driving channel, and the nth driving channel DCn may generate a pixel signal based on the first signal received from the first circuit of the adjacent repair channel RC and output the pixel signal to the jth source line SLj.

FIG. 1A illustrates that the repair channel RC is disposed on one side of the plurality of driving channels DC1 to DCn such that the driving channel in which the defect has occurred is repaired in one direction, but example embodiments are not limited thereto, and the defective driving channel may be repaired in both directions as shown in FIG. 1B.

Referring to FIG. 1B, a source driver 110' may include a plurality of repair channels, for example, a first repair channel RC1 and a second repair channel RC2, disposed on both sides of the plurality of driving channels DC1 to DCn. The source driver 110' may repair the defected driving channels in both directions by using the first repair channel RC1 and the second repair channel RC2.

For example, when a defect, such as an open and/or a short, occurs in the second driving channel DC2, the first driving channel DC1 may replace the second driving channel DC2 adjacent in a first direction, for example, in a right direction, and the first repair channel RC1 may replace the first driving channel DC1 adjacent in the first direction. The defected driving channel may be repaired by using the first repair channel RC1 according to the repair in the first direction.

For example, when a defect occurs in the third driving channel DC3, a fourth driving channel may replace the third driving channel DC3 adjacent in a second direction, such as a right direction, and a structure in which each of the fourth driving channel to the nth driving channel DCn replaces a driving channel adjacent in the second direction is repeated such that the repair channel RC may replace the nth driving channel DCn. According to the repair in the second direction, the defected driving channel may be repaired by using the second repair channel RC2.

Alternatively, when defects occurs at two of (e.g., two adjacent of) the plurality of driving channels DC1 to DCn, the repair in the first direction and the second direction may be performed based on the first repair channel RC1 and the second repair channel RC2, and thus, the two driving channels in which the defect has occurred may be repaired.

Referring to FIG. 1A, the gate driver 130 may be connected to the plurality of gate lines GL1 to GLm of the display panel 200, and may sequentially select the plurality of gate lines GL1 to GLm by sequentially applying gate-on voltages to the plurality of gate lines GL1 to GLm in one frame period. One frame period includes a plurality of horizontal periods, and one gate line may be selected in one horizontal period.

In one horizontal period, a pixel signal may be applied through a source line corresponding to each of the pixels PX connected to the selected gate line. Each of the pixels PX may store the received pixel signal and output a light signal of an intensity corresponding to a grayscale represented by the stored pixel signal for one frame period. Accordingly, an image corresponding to the image data IDT may be displayed on the display panel 200 in a frame unit.

When a defect is observed in the display panel 200, a vertical line defect in which a vertical line occurs in the display panel 200 may be due to a defect occurring in at least one of the multiple driving channels DC1 to DCn of the source driver 110. The source driver 120 according to some example embodiments may remove the vertical line defect by detecting a defected driving channel and repairing or replacing the defected driving channel (e.g., the second drive channel DC2) by using the repair channel RC.

At this time, the defected driving channel (e.g., the second drive channel DC2) is replaced by using the repair channel RC, and the repair operation is performed before the output stage of the output buffer, and thus, an increase in the size of the source driver 120 due to a circuit added for the repair operation may be reduced.

Alternatively or additionally, the vertical line defect may occur after the display device 1 is shipped to a customer even though no defect occurs during manufacturing and inspection stages of the display device 1. The source driver 120 according to some example embodiments may prevent or reduce the likelihood of and/or impact from such a progressive defect, and thus, a market defect rate of the display device 1 may be reduced.

Figure 2:
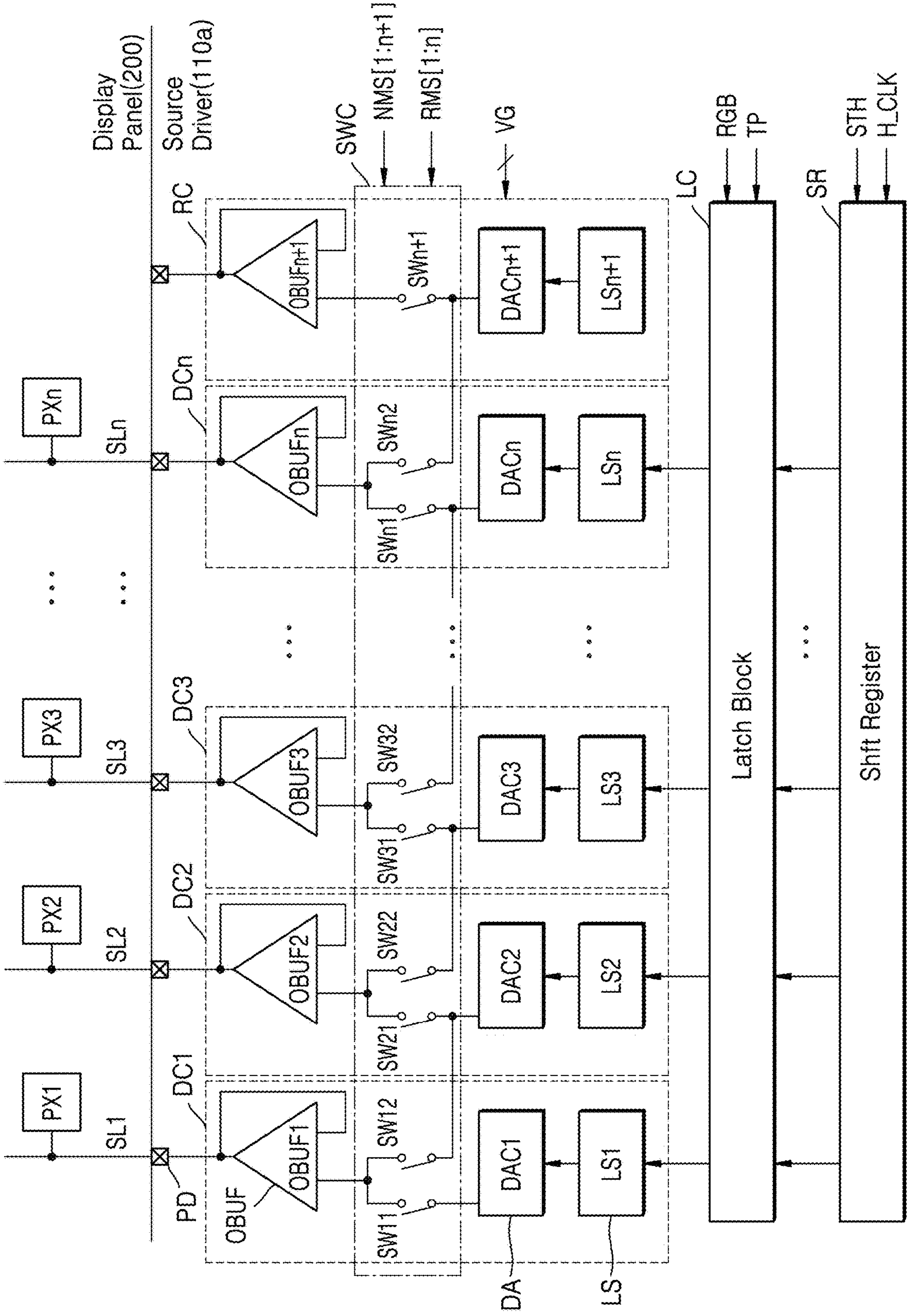
FIG. 2 illustrates a source driver according to some example embodiments.

FIG. 2 illustrates a source driver **110*a* according to some example embodiments. The source driver 110*a* of FIG. 2 may be applied to the source driver 110 of FIG. 1A and to the source driver 110' of FIG. 1**B.

Referring to FIG. 2, the source driver **110*a* may include a plurality of driving channels, for example, the first to nth driving channels DC1** to DCn, the repair channel RC, a switching circuit SWC, a latch block LC (or referred to as a latch unit), and a shift register SR.

The shift register SR controls the timing at which row data RGB is sequentially stored in the latch block LC. The shift register SR may receive a shift signal STH and a horizontal clock signal H_CLK. The shift signal STH may be inputted as one pulse every horizontal period. The shift register SR may sequentially shift the shift signal STH for each certain number of clocks of the horizontal clock signal H_CLK to generate shifted clock signals, for example, a plurality of latch clock signals provided to the latch block LC.

The latch block LC includes a plurality of latch circuits, and sequentially stores the image data RGB corresponding to one row of the display panel (200 of FIG. 1A) in the plurality of latch circuits based on the plurality of latch clock signals output from the shift register SR. When the row data RGB corresponding to one row of the display panel 200 is completely stored, the latch block LC may output the row data RGB in response to a load signal TP. The row data RGB may include a plurality of pieces of pixel data each including a plurality of bits, and the latch block LC may output the plurality of pieces of pixel data to the plurality of driving channels DC1 to DCn and the repair channel RC.

The first to nth driving channels DC1 to DCn may convert the plurality of pieces of pixel data received from the latch block LC into a plurality of pixel signals which are analog signals and provide the plurality of pixel signals to a plurality of source lines, for example, the first to nth source lines SL1 to SLn. In some example embodiments, the pixels PX connected to the first to nth source lines SL1 to SLn driven by the first to nth driving channels DC1 to DCn may output a light signal of the same color.

Each of the first to nth driving channels DC1 to DCn may include a level shifter LS, the DAC circuit DA, and the output buffer OBUF.

The level shifter LS may shift a digital level of each of '0' and '1' values of the received pixel data to an analog level.

The DAC DA may receive a plurality of grayscale voltages VG from a grayscale voltage generation circuit and may output a grayscale voltage corresponding to the received pixel data among the plurality of grayscale voltages VG. For example, when the pixel data includes 8 bits, the plurality of grayscale voltages VG may include 256 grayscale voltages VG ($=2^8$), and the DAC DA may output the grayscale voltage corresponding to the pixel data among the 256 grayscale voltages VG.

The output buffer OBUF may receive the grayscale voltage from the DAC DA and buffer the grayscale voltage. The output buffer OBUF may output the grayscale voltage as a pixel signal. The source driver **110*a* and the display panel 200 may be connected to each other through a plurality of output pads PD, and the pixel signal may be provided to the display panel 200** through the output pad PD.

FIG. 2 shows that first to nth output buffers OBUF1 to OBUFn are directly connected to the plurality of output pads PD, respectively, but example embodiments are not limited thereto, and in some example embodiments, a plurality of switches may be disposed between the first to nth output buffers OBUF1 to OBUFn and the plurality of output pads PD. The plurality of switches may perform a function of controlling connection between output stages of the first to nth output buffers OBUF1 to OBUFn and the plurality of pads PD, performing a charge sharing function, or changing a transmission path of a plurality of pixel signals output from the first to nth output buffers OBUF1 to OBUFn.

The repair channel RC may be disposed on a first side (e.g., a side in the first direction) of the first to nth driving channels DC1 to DCn, and may include the level shifter LS, the DAC DA, and the output buffer OBUF. For example, the repair channel RC may include an (n+1)th level shifter LSn+1, an (n+1)th DAC DACn+1, and an (n+1)th output buffer OBUFn+1. When a defect occurs in one of the plurality of driving channels DC1 to DCn, a driving channel neighboring or adjacent to the defected driving channel, for example, located on the first side, may replace the defected driving channel, and such a replacement structure may be repeated or shifted such that even the repair channel RC may be used. Accordingly, the defected driving channel may be repaired based on the repair channel RC.

The switching circuit SWC may include a plurality of switches SW11 to SWn1, SW12 to SWn2, and SWn+1 disposed between the DAC DA and the output buffer OBUF in the plurality of driving channels DC1 to DCn and the repair channel RC. The plurality of switches SW11 to SWn1, SW12 to SWn2, and SWn+1 may be implemented as transistors. For example, any or all of the plurality of switches SW11 to SWn1, SW12 to SWn2, and SWn+1 may be implemented as one or more of N-channel metal oxide semiconductor (NMOS) transistors, P-channel MOS (PMOS) transistors, or transfer gates.

Each of the plurality of switches SW11 to SWn1, SW12 to SWn2, and SWn+1 may be turned on or off in response to a corresponding normal mode switching signal or repair mode switching signal among a plurality of normal mode switching signals NMS[1:n+1] and a plurality of repair mode switching signals RMS[1:n]. The plurality of normal mode switching signals NMS[1:n+1] and the plurality of repair mode switching signals RMS[1:n] may be received from a control logic provided in the source driver 110*a* or the timing controller 120 (see FIG. 1A).

The switches SW11 to SWn1 and SWn+1 are normal mode switches and each of the switches SW11 to SWn1 and SWn+1 may be turned on in response to an on level of the corresponding normal mode switching signal among the plurality of normal mode switching signals NMS[1:n+1], the switches SW12 to SWn2 are repair mode switches and each of the switches SW12 to SWn2 may be turned on in response to an on level of the corresponding repair mode switching signal among the plurality of repair mode switching signals RMS[1:n].

In some example embodiments, the switch SWn+1 may be maintained in an off state regardless of an operation mode. In a normal mode and a repair mode, the normal mode switching signal NMS[n+1] among the plurality of normal mode switching signals NMS[1:n+1] may be fixed to an off level, and the switch SWn+1 may be in the off state in response to the off level of the normal mode switching signal NMS[n+1] in the normal mode and the repair mode.

In some example embodiments, the repair channel RC may include the (n+1)th level shifter LSn+1 and the (n+1)th DAC DACn+1 except for the (n+1)th output buffer OBUFn+1, and the switching circuit SWC may not include the switch SWn+1.

A pair of switches connected to the output buffer OBUF of each of the plurality of driving channels DC1 to DCn may complementarily operate, e.g., operate out-of-phase with each other. For example, when the first switch SW11 connected to the first output buffer OBUF1 is turned on, the second switch SW12 may be turned off, and when the first switch SW11 is turned off, the second switch SW12 may be turned on.

In some example embodiments, the first circuit described with reference to FIG. 1A may be or may include (or be included in) the level shifter LS and the DAC DA, and the second circuit may be or may include (or be included in) the output buffer OBUF. An intermediate signal output from the first circuit, for example, a first signal, may be or may correspond to a grayscale voltage output from the DAC DA.

Figure 3:
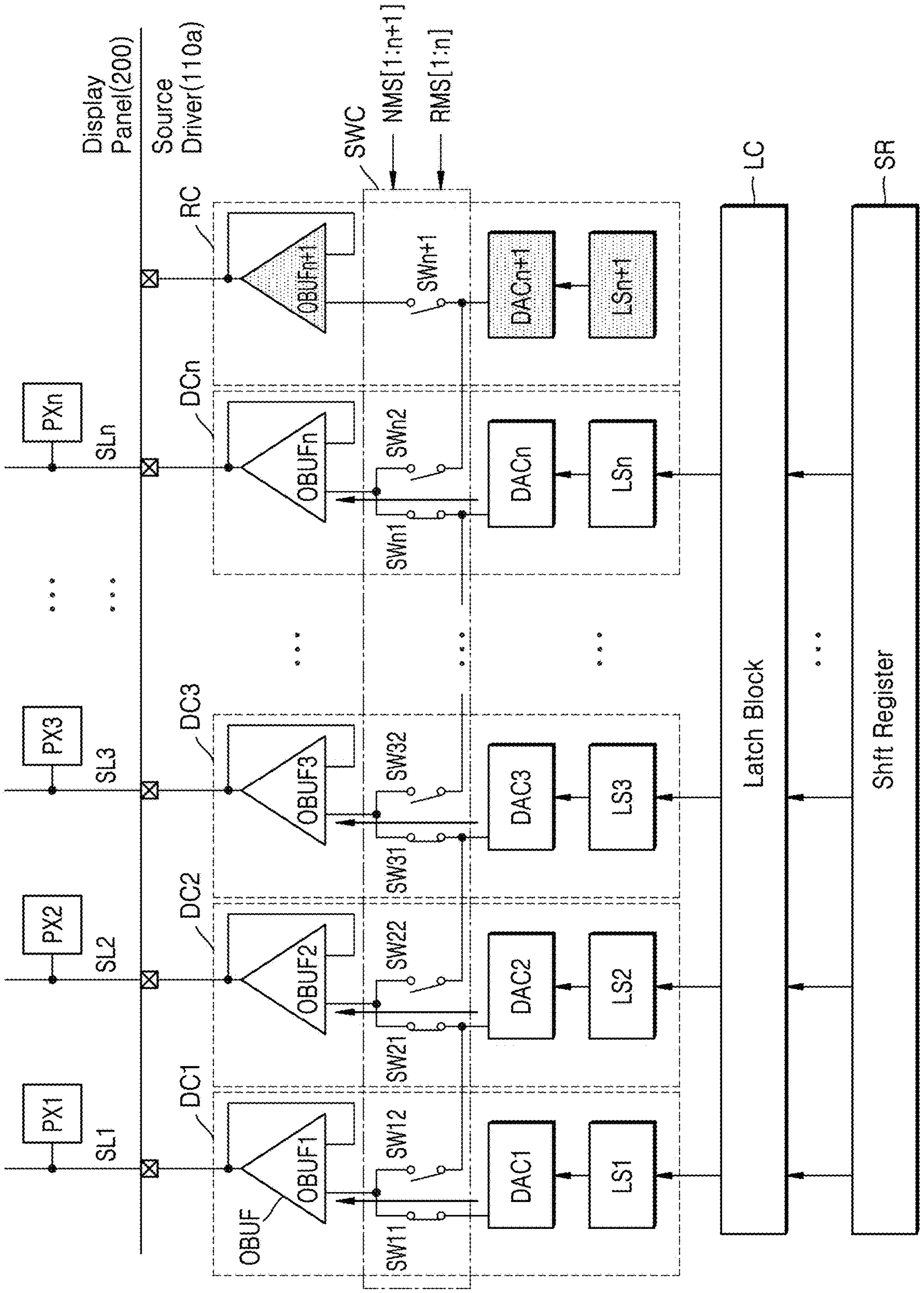
FIG. 3 illustrates a normal operation of a source driver according to some example embodiments.
Figure 4:
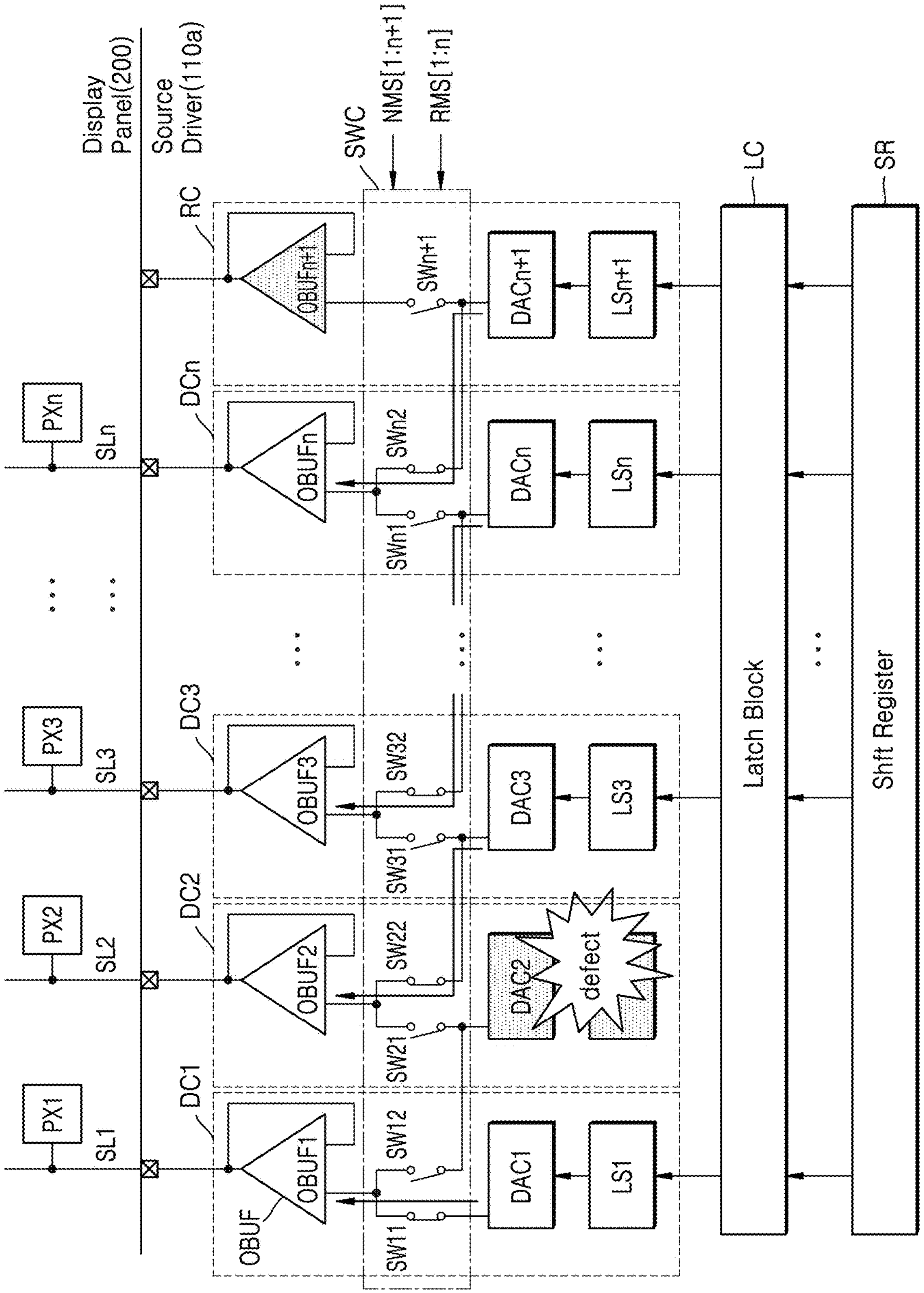
FIG. 4 illustrates a repair operation of a source driver according to some example embodiments.

FIG. 3 illustrates a normal operation of the source driver 110*a* of FIG. 2. FIG. 4 illustrates a repair operation of the source driver 110*a* of FIG. 2.

Referring to FIG. 3, when no defect occurs in the first to nth driving channels DC1 to DCn, the source driver 110*a* may operate in a normal mode. The plurality of driving channels DC1 to DCn may be activated and operate. Because an operation of the repair channel RC is not required in the normal mode, the repair channel RC may be deactivated. The (n+1)th level shifter LSn+1, the (n+1)th DAC DACn+1, and the (n+1)th output buffer OBUFn+1 of the repair channel RC may be deactivated.

The latch block LC may store row data based on a latch clock signal provided from the shift register SR, and output first to nth pixel data PXD1 to PXDn constituting the row data, respectively, to first to nth level shifters LS1 to LSn of the first to nth driving channels DC1 to DCn.

The first to nth level shifters LS1 to LSn may shift levels of the first to nth pixel data PXD1 to PXDn, and output the first to nth pixel data PXD1 to PXDn of which levels are shifted to first to nth DACs DAC1 to DACn, respectively.

Each of the first to nth DACs DAC1 to DACn may output a grayscale voltage corresponding to received pixel data among the plurality of grayscale voltages VG of FIG. 2. The first to nth DACs DAC1 to DACn may output n grayscale voltages corresponding to the first to nth pixel data PXD1 to PXDn.

The switches SW11 to SWn1 may be turned on in response to an on level of a corresponding normal mode switching signal among the normal mode switching signals NMS[1:n], and the switch SWn+1 may be turned off in response to an off level of a normal mode switching signal NMS[n+1]. Alternatively or additionally, the switches SW12 to SWn2 may be turned off in response to off levels of a plurality of repair mode switching signals RMS[1:n]. Accordingly, the n grayscale voltages output from the first to nth DACs DAC1 to DACn may be respectively provided to the first to nth output buffers OBUF1 to OBUFn. The first to nth output buffers OBUF1 to OBUFn may buffer the n grayscale voltages, and output the n grayscale voltages as n pixel signals to the first to nth source lines SL1 to SLn.

Referring to FIG. 4, when a defect occurs in any one of the first to nth driving channels DC1 to DCn, the source driver 110*a* may operate in a repair mode. For example, it is assumed that a defect has occurred in the second driving channel DC2.

The first driving channel DC1 and the third to nth driving channels DC3 to DCn may be activated and may operate. The repair channel RC may be partially activated and operate, and the second driving channel DC2 may be partially deactivated. Here, the (n+1)th level shifter LSn+1 and the (n+1)th DAC DACn+1 of the repair channel RC may be activated and operate. The (n+1)th output buffer OBUFn+1 of the repair channel RC may remain deactivated. The repair channel RC may be wholly deactivated in the normal mode, and the (n+1)th level shifter LSn+1 and the (n+1)th DAC DACn+1 may be activated and operate in the repair mode. The second level shifter LS2 and the second DAC DAC2 of the second driving channel DC2 may be deactivated, and the second output buffer OBUF2 may be activated and operate.

The latch block LC may output the first to nth pixel data PXD1 to PXDn to the first driving channel DC1, the third to nth driving channels DC3 to DCn, except for the second driving channel DC2 among the first to nth driving channels DC1 to DCn, and the repair channel RC. The latch block LC may output the first to nth pixel data PXD1 to PXDn to the first level shifter LS1 and the third to (n+1)th level shifters LS3 to LSn+1, respectively.

The first level shifter LS1 and the third to (n+1)th level shifters LS3 to LSn+1 may shift levels of the first to nth pixel data PXD1 to PXDn, and may output the level-shifted first to nth pixel data PXD1 to PXDn of which levels are shifted to the first DAC DAC1 and the third to (n+1)th DACs DAC3 to DACn+1. The first DAC DAC1 and the third to (n+1)th DACs DAC3 to DACn+1 may output the n grayscale voltages corresponding to the first to nth pixel data PXD1 to PXDn.

The switch SW11 may be turned on in response to an on level of a normal mode switching signal NMS[1] and the switch SW12 may be turned off in response to an off level of a repair mode switching signal RMS[1]. The switches SW21 to SWn1 and SWn+1 may be turned off in response to off levels of normal mode switching signals NMS[2:n+1] and the switches SW22 to SWn2 may be turned on in response to on levels of repair mode switching signals RMS[2:n]. The switches SW22 to SWn2 which are turned on may change signal transmission paths of the third to nth driving channels DC3 to DCn and the repair channel RC.

A grayscale voltage output from the first DAC DAC1 of the first driving channel DC1 may be provided to the first output buffer OBUF1 of the first driving channel DC1, a grayscale voltage output from the third DAC DAC3 of the third driving channel DC3 may be provided to the second output buffer OBUF2 of the second driving channel DC2, and a grayscale voltage output from the (n+1)th DAC DACn+1 of the repair channel RC may be provided to the nth output buffer OBUFn of the nth driving channel DCn. Accordingly, the n grayscale voltages output from the first DAC DAC1 and the third to (n+1)th DACs DAC3 to DACn+1 may be provided to the first to nth output buffers OBUF1 to OBUFn.

As described above, the switching circuit SWC may change the signal transmission path of the third to nth driving channels DC3 to DCn and the repair channel RC by shifting n−1 grayscale voltages generated in the third to nth driving channels DC3 to DCn and the repair channel RC to driving channels adjacent in a second direction, such as the second to nth driving channels DC2 to DCn. The repair circuit RC may be arranged serially.

Each of the first to nth output buffers OBUF1 to OBUFn may buffer the received grayscale voltage and output the grayscale voltage as a pixel signal. The first to nth output buffers OBUF1 to OBUFn may output n pixel signals to the first to nth source lines SL1 to SLn.

As described above, the source driver 110*a* according to some example embodiments may repair a defected driving channel (e.g., the second driving channel DC2) using the repair channel RC in a method in which driving channels and the repair channel RC replace adjacent driving channels, respectively, and may perform the repair operation before the output buffer OBUF.

Unlike the repair operation of the source driver 110*a* according to some example embodiments, when a repair operation of a source driver according to a comparative example is performed after the output buffer OBUF, a switching circuit performing the repair operation needs to be disposed between the first to nth output buffers OBUF1 to OBUFn and the plurality of output pads PD. Because switches disposed between the first to nth output buffers OBUF1 to OBUFn and the plurality of output pads PD function as a load charging path and a load discharging path, sizes of the switches (e.g., transistors) may be relatively larger than sizes when the switches are disposed before the first to nth output buffers OBUF1 to OBUFn. Accordingly, the size of the source driver may be greatly increased for the repair operation.

However, in the source driver 110*a* according to some example embodiments, the switching circuit SWC performing the repair operation is disposed before the first to nth output buffers OBUF1 to OBUFn, and the plurality of switches SW11 to SWn1, SW12 to SWn2, and SWn+1 provided in the switching circuit SWC do not function as the load charging path or the load discharging path, and thus, the plurality of switches SW11 to SWn1, SW12 to SWn2, and SWn+1 may be relatively small. For example, the sizes of the plurality of switches SW11 to SWn1, SW12 to SWn2, and SWn+1 may be small, e.g., may be the minimum according to a design rule. Therefore, an increase in the size of the source driver 110*a* for the repair operation may be reduced (or minimized).

Figure 5:
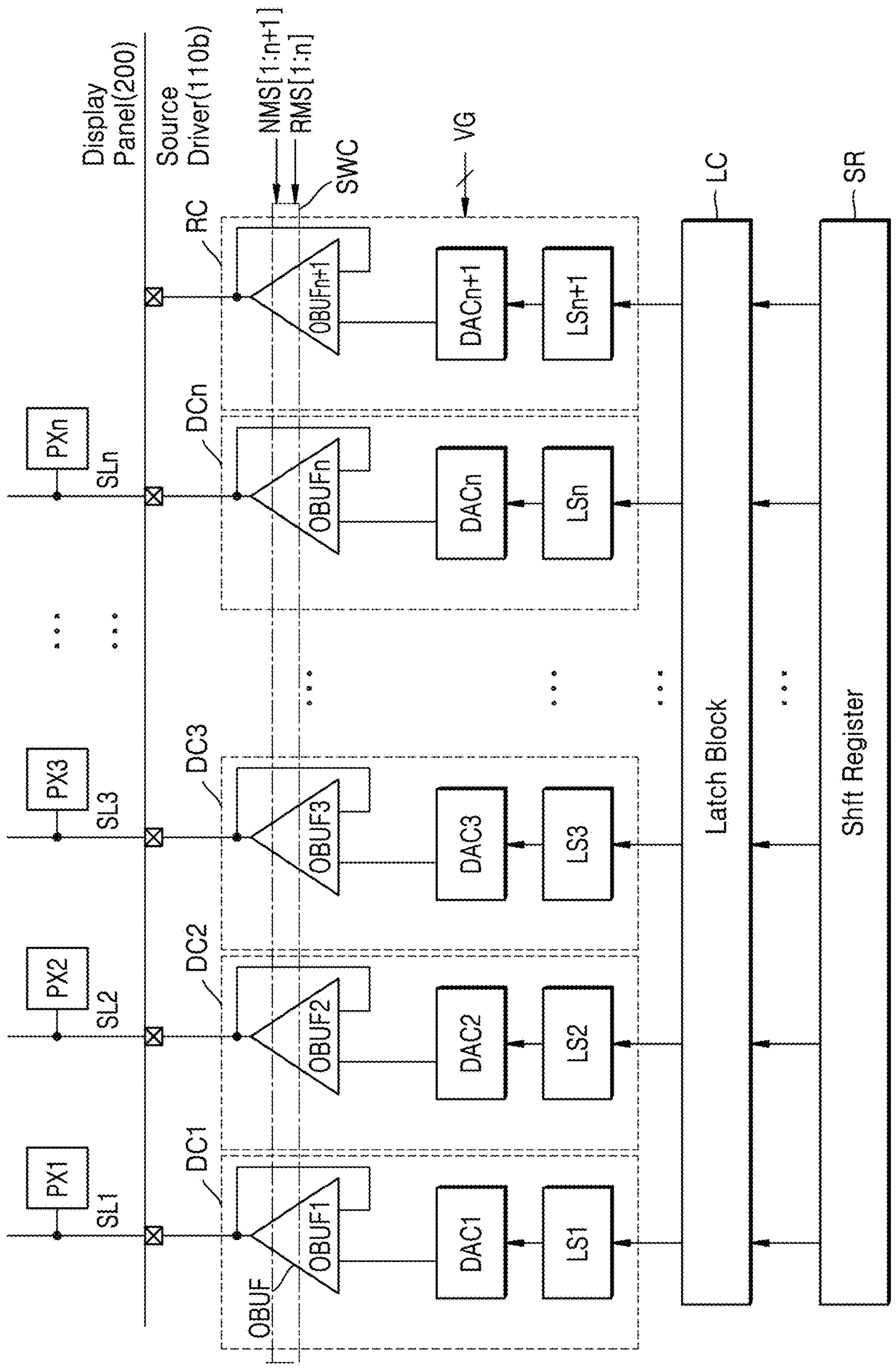
FIG. 5 illustrates a source driver according to some example embodiments.
Figure 6:
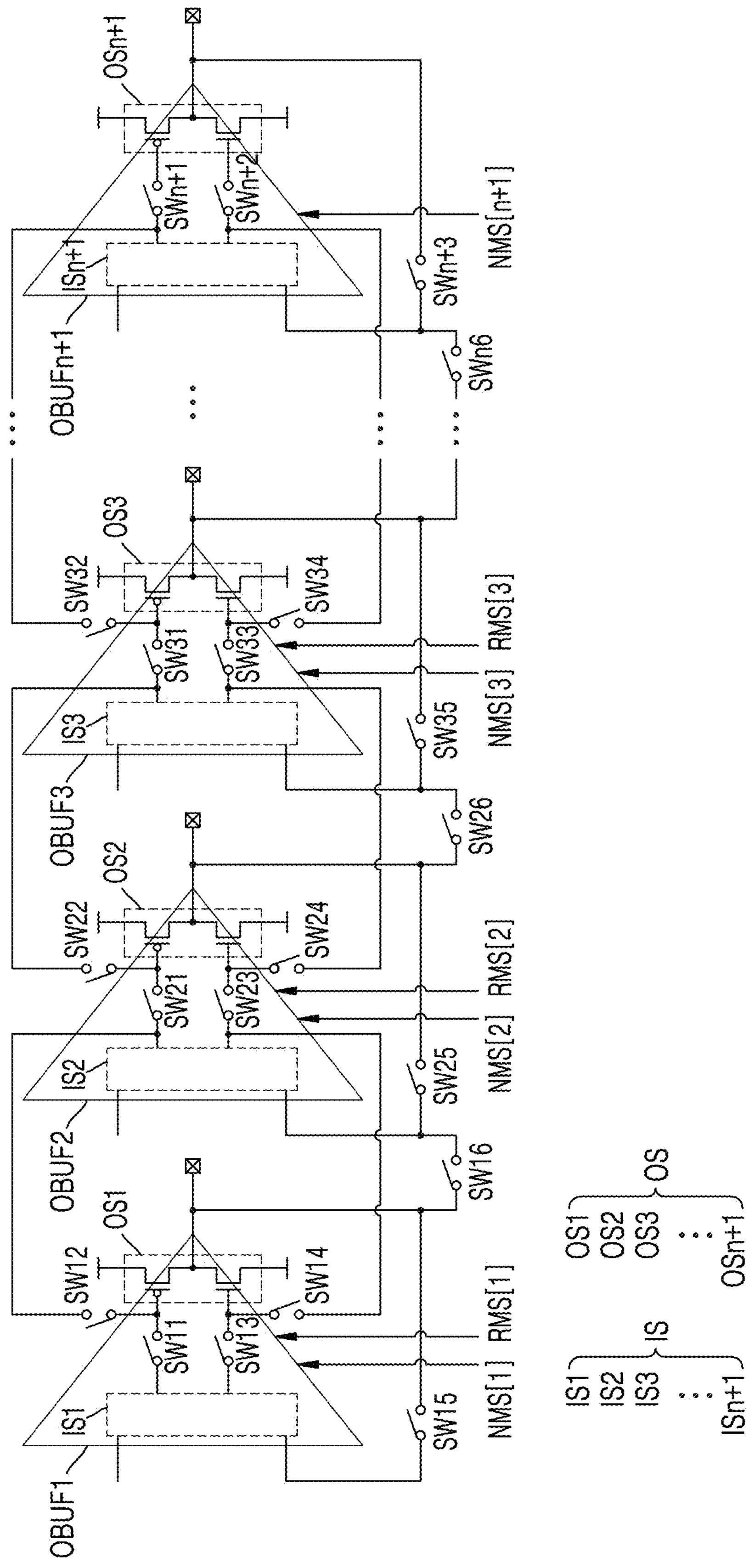
FIG. 6 illustrates connection of a plurality of output buffers included in a source driver according to some example embodiments.

FIG. 5 illustrates a source driver 110*b* according to some example embodiments. FIG. 6 illustrates connection of the plurality of output buffers OBUF1~OBUFn+1 included in the source driver 110*b* according to some example embodiments. The source driver 110*b* of FIG. 5 may be applied to the source driver 110 of FIG. 1.

Referring to FIG. 5, the source driver 110*b* may include a plurality of driving channels, for example, the first to nth driving channels DC1 to DCn, the repair channel RC, the switching circuit SWC, the latch block LC, and the shift register SR. Each of the first to nth driving channels DC1 to DCn and the repair channel RC may include the level shifter LS, the DAC DA, and the output buffer OBUF.

In some example embodiments, the switching circuit SWC may be disposed between an input stage (IS of FIG. 6) and an output stage (OS of FIG. 6) of the first to (n+1)th output buffers OBUF1 to OBUFn+1 of the first to nth driving channels DC1 to DCn and the repair channel RC.

Referring to FIG. 6, each of the first to (n+1)th output buffers OBUF1 to OBUFn+1 may include the input stage IS and the output stage OS. The input stage IS may generate and output an intermediate signal (hereinafter, referred to as a first signal) based on a received grayscale voltage, and the output stage OS may generate and output a pixel signal (e.g., a grayscale voltage) based on the received first signal. Here, the first signal may include one or two signals. For example, when the output buffer OBUF has a rail-to-rail structure, the first signal may include two signals.

The switching circuit SWC may include a plurality of switches, for example, SW11, SW21, SW31, SW12, SW22, SW32, SW13, SW23, SW33, SW14, SW24, SW34, SWn+1, and SWn+2, disposed between a plurality of input stages IS1 to ISn+1 and a plurality of output stages OS1 to OSn+1, and a plurality of other switches, for example, SW15, SW16, SW25, SW26, SW35, SWn6, and SWn+3, disposed between input nodes and output nodes of the first to n+1 output buffers OBUF1 to OBUFn+1.

The switches SW11, SW21, SW31, SW13, SW23, SW15, SW25, SW35, SW33, SWn+1, SWn+2, and SWn+3 may be normal mode switches or normally on switches, and may be turned on in response to on levels of the plurality of normal mode switching signals NMS[1:n+1], and the switches SW12, SW22, SW32, SW14, SW24, SW34, SW16, SW26, and SWn6 are repair mode switches, and may be turned on in response to on levels of the plurality of repair mode switching signals RMS[1:n].

The switches SW11 and SW13 disposed between the first input stage IS1 and the first output stage OS1 of the first output buffer OBUF1, and the switch SW15 disposed between the input node and the output node of the first output buffer OBUF1 may be turned on or off in response to the normal mode switching signal NMS[1], and the switches SW12 and SW14 disposed between the second input stage IS2 of the second output buffer OBUF2 and the first input stage IS1 of the first output buffer OBUF1 and the switch SW16 disposed between the input node of the second output buffer OBUF2 and the output node of the first output buffer OBUF1 may be turned on or off in response to a repair mode switching signal RMS[1]. The switches SW11, SW13, and SW15 and the switches SW12, SW14, and SW16 may operate complementarily. For example, when the switches SW11, SW13, and SW15 are turned on, the switches SW12, SW14, and SW16 may be turned off, and when the switches SW11, SW13, and SW15 are turned off, the switches SW12, SW14, and SW16 may be turned on.

The switches SW11 and SW13 may be turned on in response to the on level of the normal mode switching signal NMS[1] to provide the first signal output from the first input stage IS1 to the first output stage OS1. The switch SW15 may be turned on in response to the on level of the normal mode switching signal NMS[1] to feed back a signal output from the first output stage OS1 to the first input stage IS1.

The switches SW12 and SW14 may be turned on in response to the on level of the repair mode switching signal RMS[1] to provide the first signal output from the second output stage OS2 of the second output buffer OBUF2 to the second input stage IS2. The switch SW16 may be turned on in response to the on level of the repair mode switching signal RMS[1] to feed back a signal output from the first output stage OS1 of the first output buffer OBUF1 to the second input stage IS2 of the second output buffer OBUF2.

As described above, the first signal of the input stage IS may be transmitted to the output stage OS of the same output buffer OBUF or the output stage OS of the adjacent output buffer OBUF according to the switches SW11, SW21, SW31, SW12, SW22, SW32, SW13, SW23, SW33, SW14, SW24, SW34, SW15, SW25, SW35, SW16, SW26, SWn6, SWn+1, SWn+2, and SWn+3 which are turned on or off.

In the normal mode, the first to nth driving channels DC1 to DCn may be activated and operate, and the repair channel RC may be deactivated.

Figure 7:
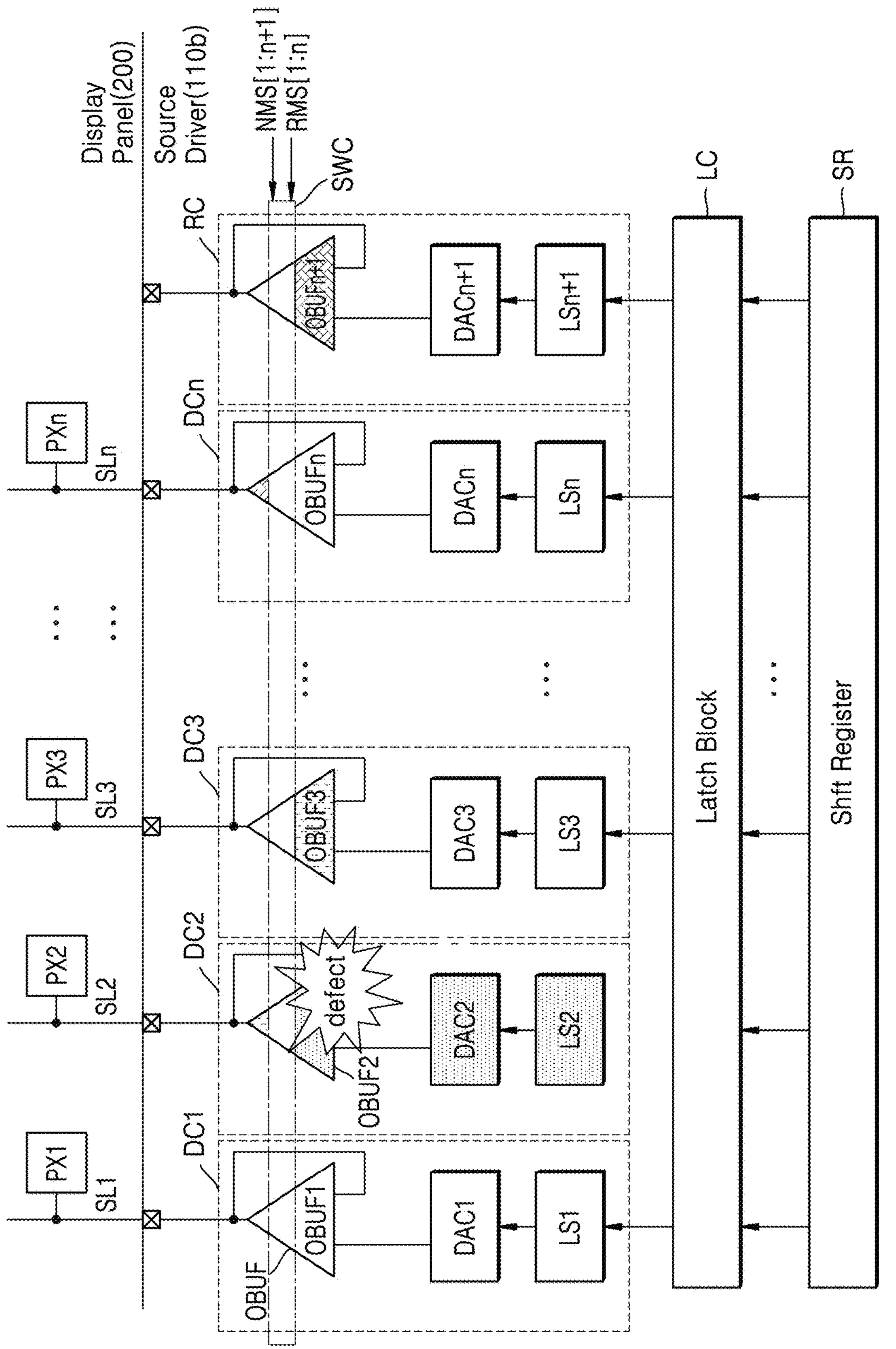
FIGS. 7 and 8 illustrate a repair operation of a source driver according to some example embodiments.
Figure 8:
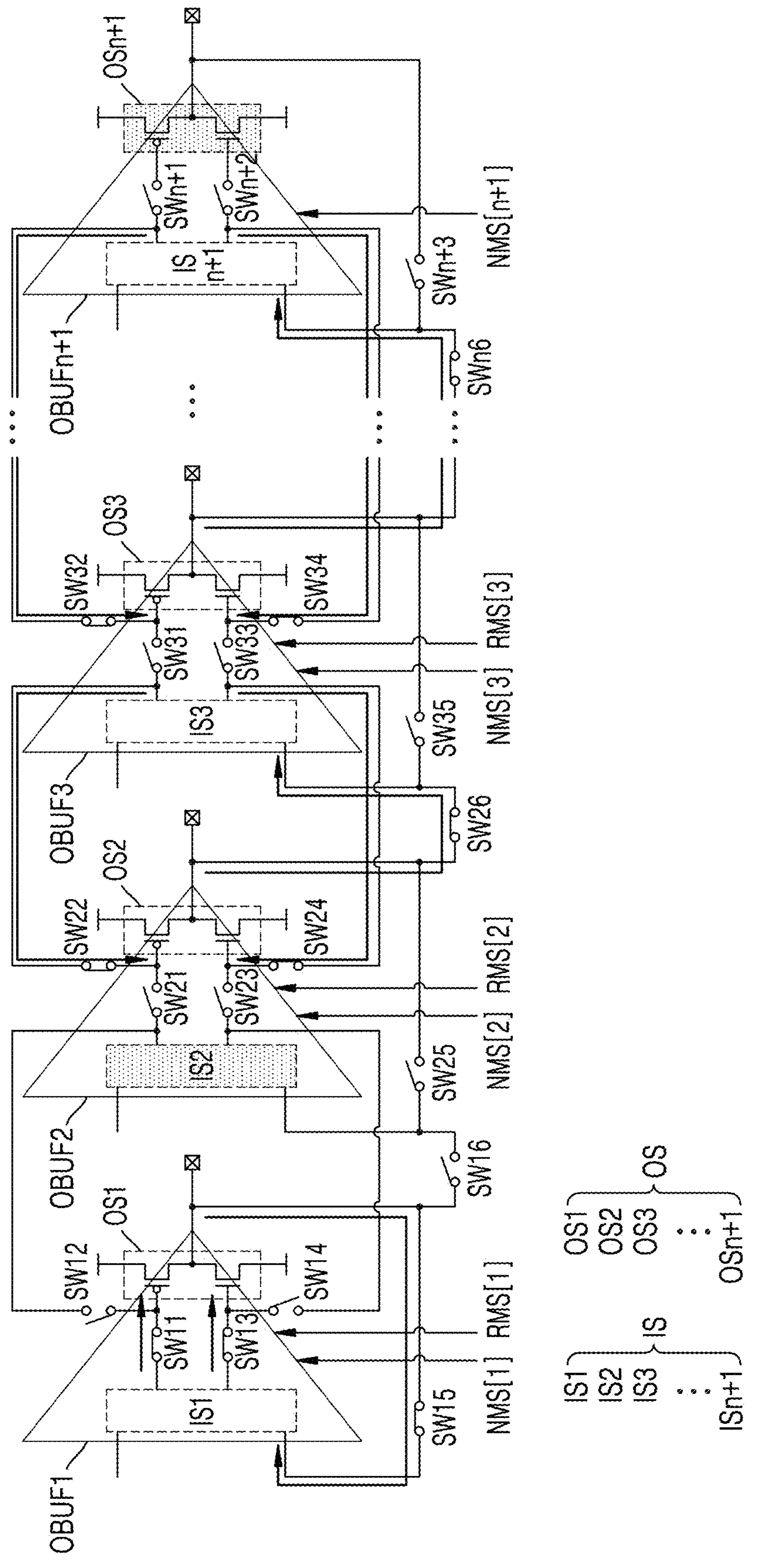

FIGS. 7 and 8 illustrate a repair operation of a source driver according to some example embodiments. For example, it is assumed that a defect has occurred in the second driving channel DC2.

In a repair mode, the first driving channel DC1 and the third to nth driving channels DC3 to DCn may be activated and operate, a part of the repair channel RC may be activated and operate, and a part of the second driving channel DC2 may be deactivated. In the repair mode, the (n+1)th level shifter LSn+1, the (n+1)th DAC DACn+1, and the (n+1)th input stage ISn+1 of the (n+1)th output buffer OBUFn+1 of the repair channel RC may be activated, and the (n+1)th output stage OSn+1 of the (n+1)th output buffer OBUFn+1 of the repair channel RC may be deactivated. The repair channel RC may be entirely deactivated in a normal mode, and in the repair mode, the (n+1)th level shifter LSn+1, the (n+1)th DAC DACn+1, and the (n+1)th input stage ISn+1 of the (n+1)th output buffer OBUFn+1 may be activated and operate. The second level shifter LS2, the second DAC DAC2, and the second input stage IS2 of the second output buffer OBUF2 of the second driving channel DC2 may be deactivated, and the second output stage OS2 of the second output buffer OBUF2 of the second driving channel DC2 may be activated and operate.

The latch block LC may respectively output the first to nth pixel data PXD1 to PXDn to the first level shifter LS1, and the third to nth level shifters LS3 to LSn of the first driving channels DC1, and the third to nth driving channels DC3 to DCn, except for the second driving channel DC2 in which the defect has occurred among the first to nth driving channels DC1 to DCn, and the (n+1)th level shifters LSn+1 of the repair channels RC.

The first level shifter LS1 and the third to (n+1)th level shifters LS3 to LSn+1 may convert levels of the first to nth pixel data PXD1 to PXDn, and output the first to nth pixel data PXD1 to PXDn of which levels have been converted to the first DAC1 and the third to (n+1)th DACs DAC3 to DACn+1. The first DAC1 and the third to (n+1)th DACs DAC3 to DACn+1 may output n grayscale voltages corresponding to the first to nth pixel data PXD1 to PXDn to the first output buffer OBUF1 and the third to (n+1)th output buffers OBUF3 to OBUFn+1.

The input stage IS of each of the first output buffer OBUF1 and the third to n+1 output buffers OBUF3 to OBUFn+1 may generate a first signal based on the received grayscale voltage.

The switches SW11 and SW13 may be turned on in response to an on level of the normal mode switching signal NMS[1] to provide the first signal output from the first input stage IS1 to the first output stage OS1. The switch SW15 may be turned on in response to the on level of the normal mode switching signal NMS[1] to feed back a signal output from the first output stage OS1 to the first input stage IS1. The switches SW12, SW14, and SW16 may be turned off in response to an off level of the repair mode switching signal RMS[1].

The switches SW21, SW23, SW25, SW31, SW33, SW35, . . . , SWn+1, SWn+2, and SWn+3 may be turned off in response to an off level of the normal mode switching signal NMS[2:n+1]. The switches SW22, SW24, SW26, SW32, SW34, . . . , SWn6 may be turned on in response to an on level of the repair mode switching signal RMS[2:n].

The first signal output from the third input stage IS3 of the third output buffer OBUF3 may be provided to the second output stage OS2 of the second output buffer OBUF2, and the first signal output from a fourth input stage (not shown) of the fourth output buffer OBUF4 may be provided to the third output stage OS3 of the third output buffer OBUF3. In addition, the first signal output from the (n+1)th input stage ISn+1 of the (n+1)th output buffer OBUFn+1 provided in the repair channel RC may be provided to an nth output stage (not shown) of the nth output buffer OBUFn provided in the nth driving channel DCn. Accordingly, the third input stage IS3 of the third output buffer OBUF3 and the second output stage OS2 of the second output buffer OBUF2 may operate as one output buffer, the fourth input stage of the fourth output buffer OBUF4 and the third output stage OS3 of the third output buffer OBUF3 may operate as one output buffer, and the (n+1)th input stage ISn+1 of the (n+1)th output buffer OBUFn and the nth output stage of the nth output buffer OBUFn may operate as one output buffer.

Each of the first to nth output stages OS1 to OSn of the first to nth output buffers OBUF1 to OBUFn may output a pixel signal (e.g., a grayscale voltage) according to the received first signal.

As described above, the switching circuit SWC may change a signal transmission path of the third to nth driving channels DC3 to DCn and the repair channel RC by shifting the n first signals generated in the third to nth driving channels DC3 to DCn and the repair channel RC to driving channels adjacent in a second direction, for example, the second to nth driving channels DC2 to DCn.

Figure 9:
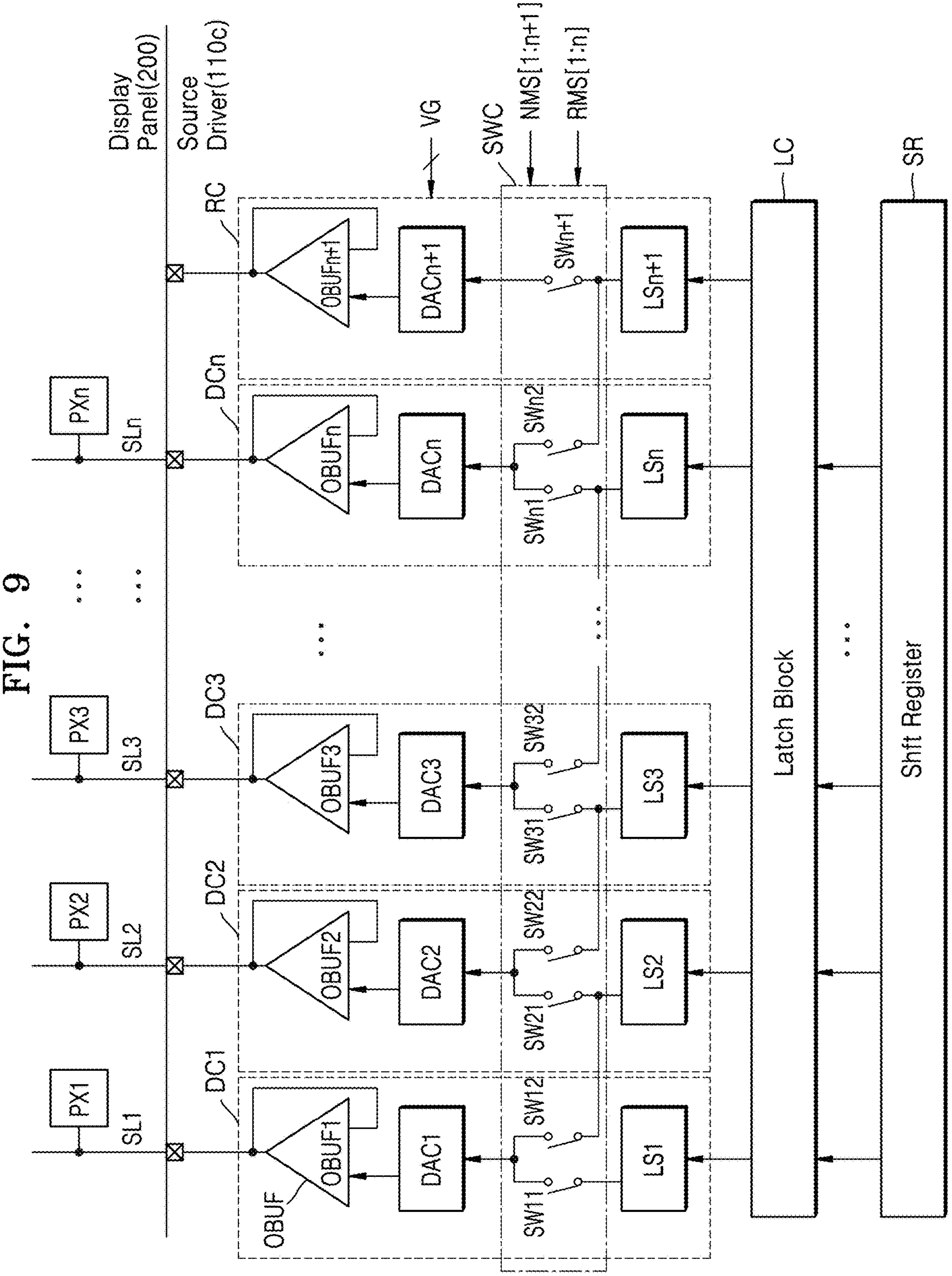
FIG. 9 illustrates a source driver according to some example embodiments.
Figure 10:
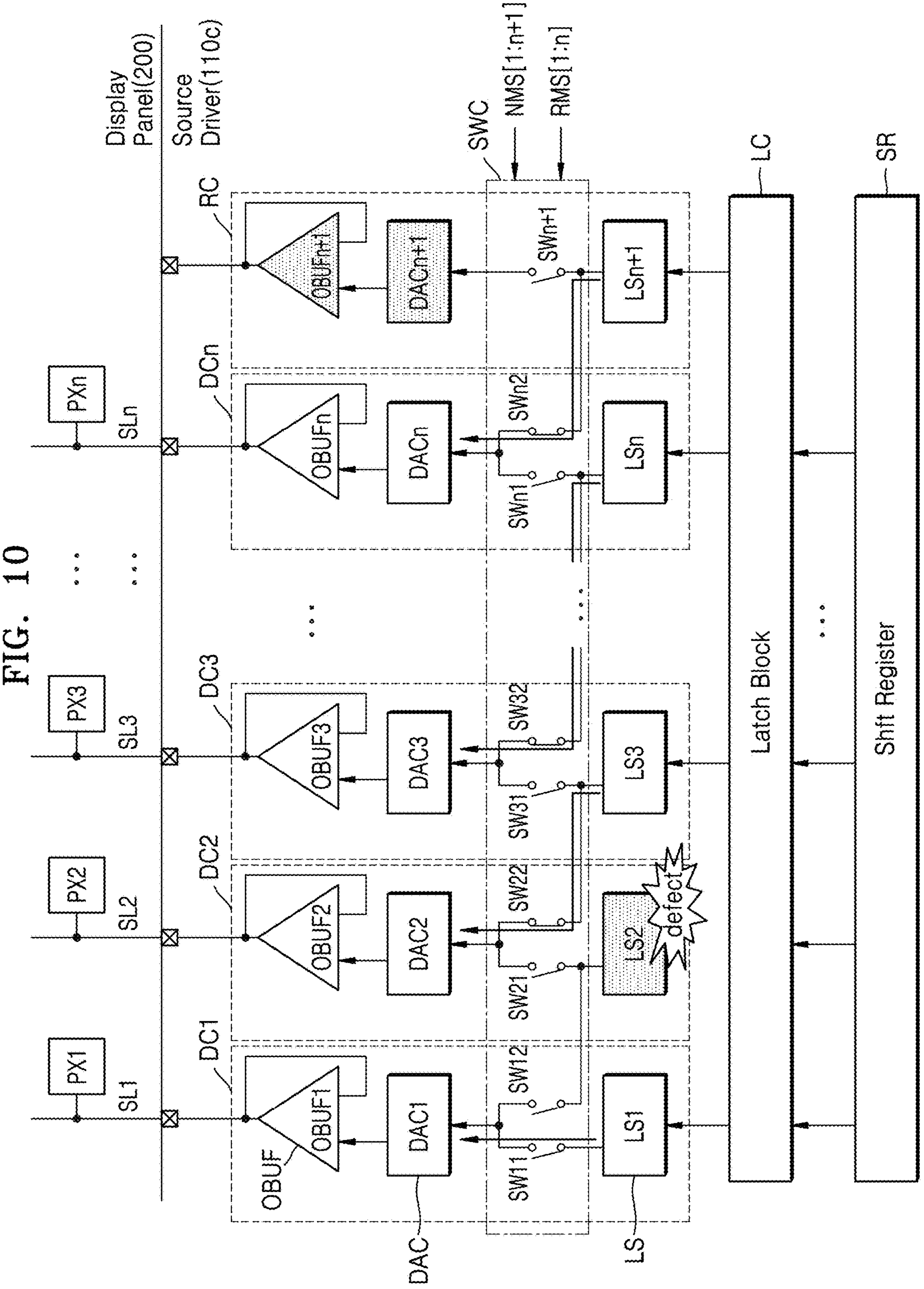
FIG. 10 illustrates a repair operation of a source driver according to some example embodiments.

FIG. 9 illustrates a source driver 110*c* according to some example embodiments. FIG. 10 illustrates a repair operation of the source driver 110*c* according to some example embodiments. The source driver 110*c* of FIG. 9 may be applied to the source driver 110 of FIG. 1A and the source driver 110' of FIG. 1B.

Referring to FIG. 9, the source driver 110*c* may include a plurality of driving channels, for example, the first to nth driving channels DC1 to DCn, the repair channel RC, the switching circuit SWC, the latch block LC, and the shift register SR. Each of the first to nth driving channels DC1 to DCn and the repair channel RC may include the level shifter LS, the DAC DA, and the output buffer OBUF.

In some example embodiments, the switching circuit SWC may be disposed between the first to (n+1)th level shifters LS1 to LSn+1 and the first to (n+1)th DACs DAC1 to DACn+1. The switching circuit SWC may include a plurality of switches, for example, the switches SW11 to SWn1, SW12 to SWn2, and SWn+1, disposed between the level shifter LS and the DAC DA in the first to nth driving channels DC1 to DCn and the repair channel RC.

The plurality of switches SW11 to SWn1, SW12 to SWn2, and SWn+1 may be turned on or off in response to a corresponding normal mode switching signal or a repair mode switching signal among the plurality of normal mode switching signals NMS[1:n+1] and the plurality of repair mode switching signals RMS[1:n]. The switches SW11 to SWn1 and SWn+1 are normal mode switches, and may be turned on in response to an on level of the corresponding normal mode switching signal among the plurality of normal mode switching signals NMS[1:n+1], and the switches SW12 to SWn2 are repair mode switches, and may be turned on in response to an on level of the corresponding repair mode switching signal among the plurality of repair mode switching signals RMS[1:n]. In some example embodiments, the switch SWn+1 may always be in an off state. In a normal mode and a repair mode, the normal mode switching signal NMS[n+1] may be fixed to the off level, and accordingly, the switch SWn+1 may be in the off state in the normal mode and the repair mode.

A pair of switches connected to the DAC DA of each of the plurality of driving channels DC1 to DCn may complementarily operate. For example, when the first switch SW11 connected to the first DAC DAC1 is turned on, the second switch SW12 may be turned off, and when the first switch SW11 is turned off, the second switch SW12 may be turned on.

In some example embodiments, a first circuit described with reference to FIG. 1A may be the level shifter LS, and a second circuit may be the DAC DA and the output buffer OBUF. An intermediate signal output from the first circuit, for example, the first signal, may be pixel data of which levels are shifted output from the level shifter LS.

In the normal mode, the first to nth driving channels DC1 to DCn may be activated and operate, and the repair channel RC may be deactivated.

Referring to FIG. 10, when a defect occurs in any one of the first to nth driving channels DC1 to DCn, the source driver 110*c* may operate in the repair mode. For example, it is assumed that a defect has occurred in the second level shifter LS2 of the second driving channel DC2.

In the repair mode, the first driving channel DC1 and the third to nth driving channels DC3 to DCn may be activated and operate, a part of the repair channel RC may be activated and operate, and a part of the second driving channel DC2 may be deactivated. Here, the (n+1)th level shifter LSn+1 of the repair channel RC may be activated and operate, and the (n+1)th DAC DACn+1 and the (n+1)th output buffer OBUFn+1 may be deactivated. The repair channel RC may be entirely deactivated in the normal mode, and the (n+1)th level shifter LSn+1 may be activated and operate in the repair mode. The second level shifter LS2 of the second driving channel DC2 may be deactivated, and the second DAC DAC2 and the second output buffer OBUF2 may be activated and operate.

The latch block LC may output the first to nth pixel data PXD1 to PXDn to the first level shifter LS1 and the third to (n+1)th level shifters LS3 to LSn+1, respectively.

The first level shifter LS1 and the third to (n+1)th level shifters LS3 to LSn+1 may shift levels of the first to nth pixel data PXD1 to PXDn, and output the first to nth pixel data PXD1 to PXDn of which levels are shifted.

The switch SW11 may be turned on in response to an on level of the normal mode switching signal NMS[1] and the switch SW12 may be turned off in response to an off level of the repair mode switching signal RMS[1]. The switches SW21 to SWn1 and SWn+1 may be turned off in response to off levels of the normal mode switching signals NMS[2:n+1] and the switches SW22 to SWn2 may be turned on in response to on levels of the repair mode switching signals RMS[2:n]. The switches SW22 to SWn2 which are turned on may change signal transmission paths of the third to nth driving channels DC3 to DCn and the repair channel RC.

The first pixel data PXD1 of which level is shifted output from the first level shifter LS1 of the first driving channel DC1 may be provided to the first DAC DAC1 of the first driving channel DC1, and the second to nth pixel data PXD2 to PXDn of which level is shifted output from the third to (n+1)th level shifters LS3 to LSn+1 of the third to nth driving channels DC3 to DCn and the repair channel RC may be provided to the second to nth DACs DAC2 to DACn of the second to nth driving channels DC2 to DCn. Accordingly, n pixel data of which levels are shifted output from the first level shifter LS1 and the third to (n+1)th level shifters LS3 to LSn+1 may be provided to the first to nth DACs DAC1 to DACn.

The first to nth DACs DAC1 to DACn may generate n grayscale voltages corresponding to the received n pixel data of which levels are shifted, and may provide the n grayscale voltages to the first to nth output buffers OBUF1 to OBUFn. Each of the first to nth output buffers OBUF1 to OBUFn may buffer the received grayscale voltage and output the grayscale voltage as a pixel signal. The first to nth output buffers OBUF1 to OBUFn may output n pixel signals to the first to nth source lines SL1 to SLn.

As described above, the source driver 110*c* according to some example embodiments may repair the defected driving channel (e.g., the second driving channel DC2) by using the repair channel RC, and the repair operation may be performed before the DAC DA.

Figure 11:
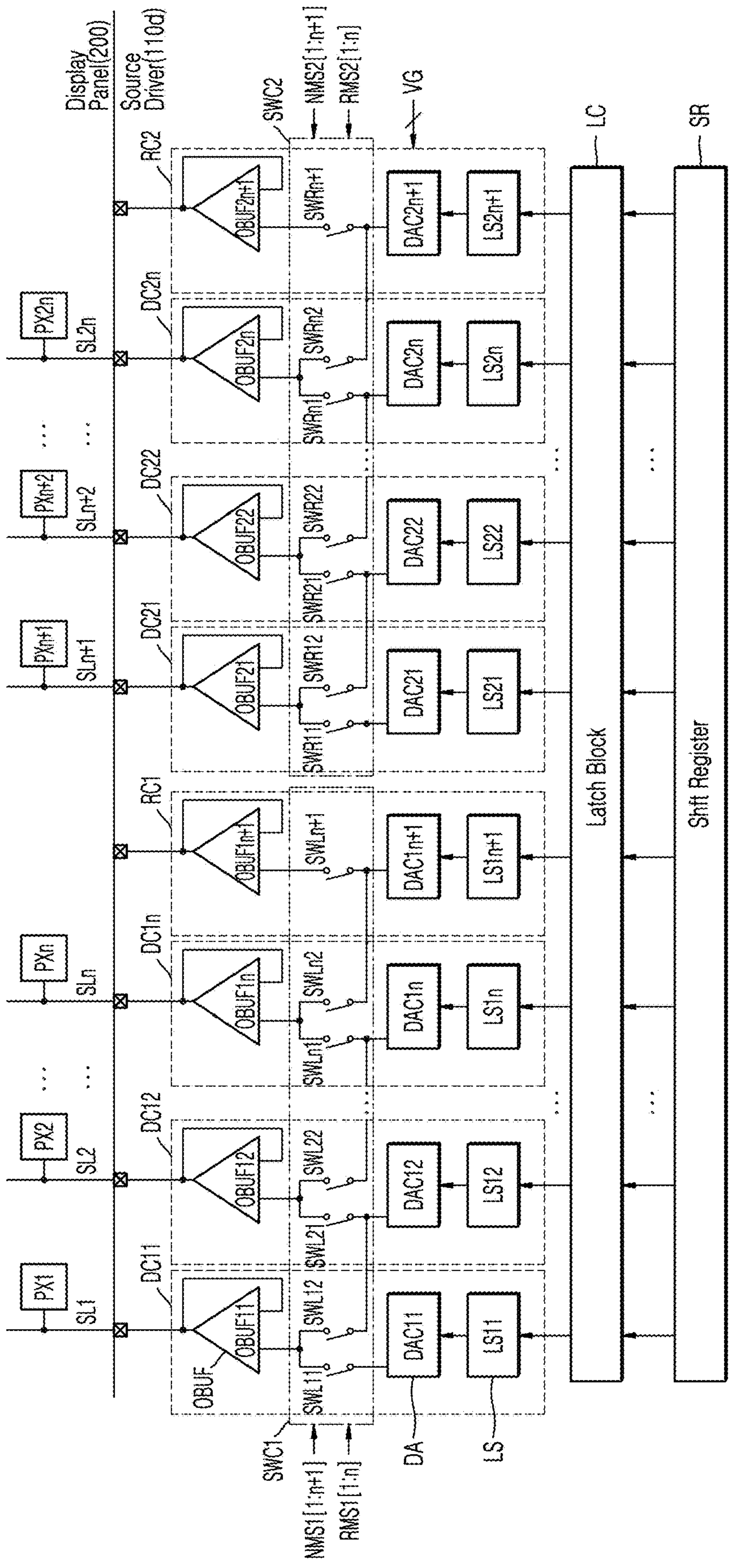
FIG. 11 illustrates a source driver according to some example embodiments.
Figure 12A:
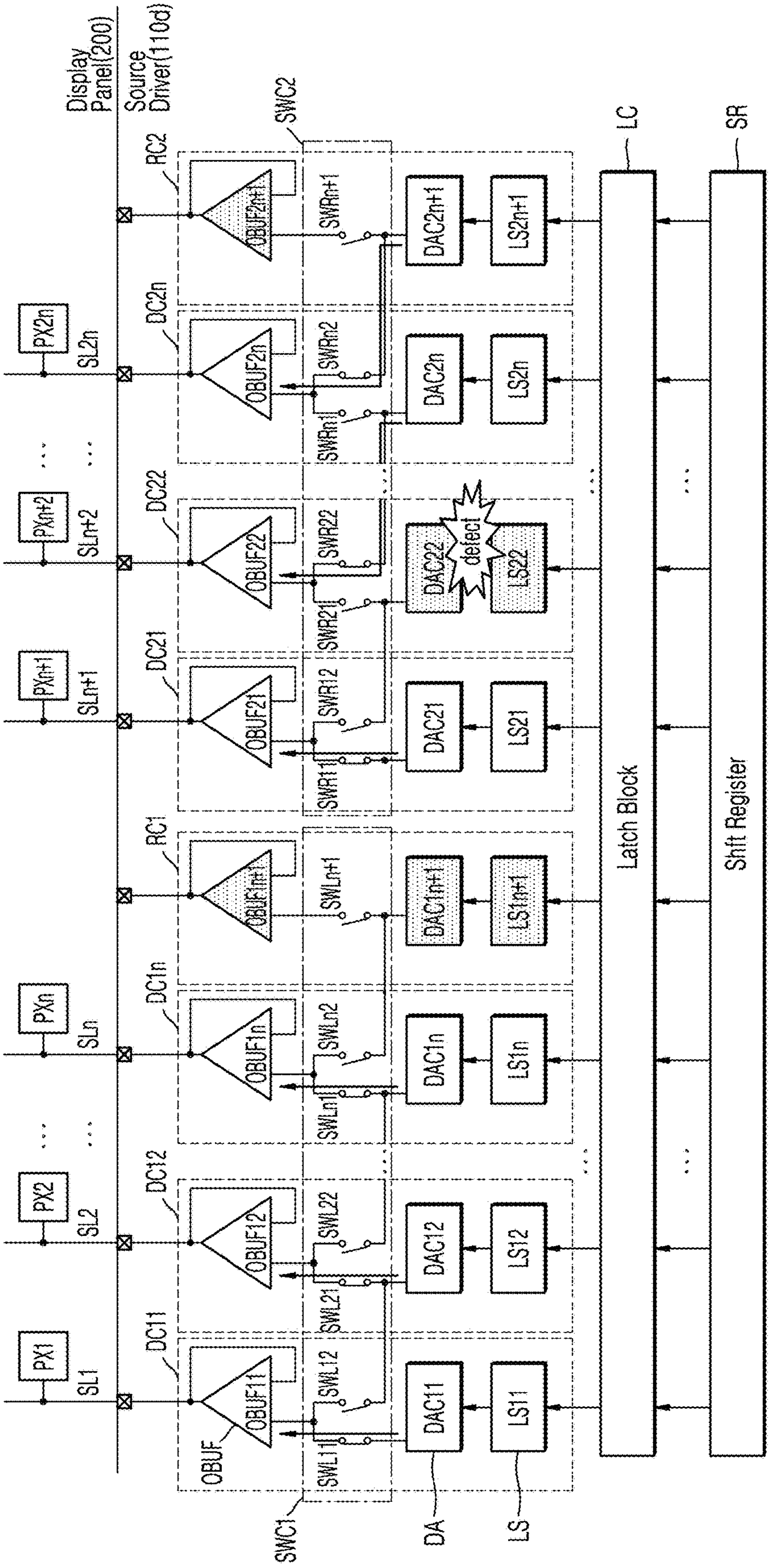
FIGS. 12A and 12B illustrate repair operations of a source driver according to some example embodiments.
Figure 12B:
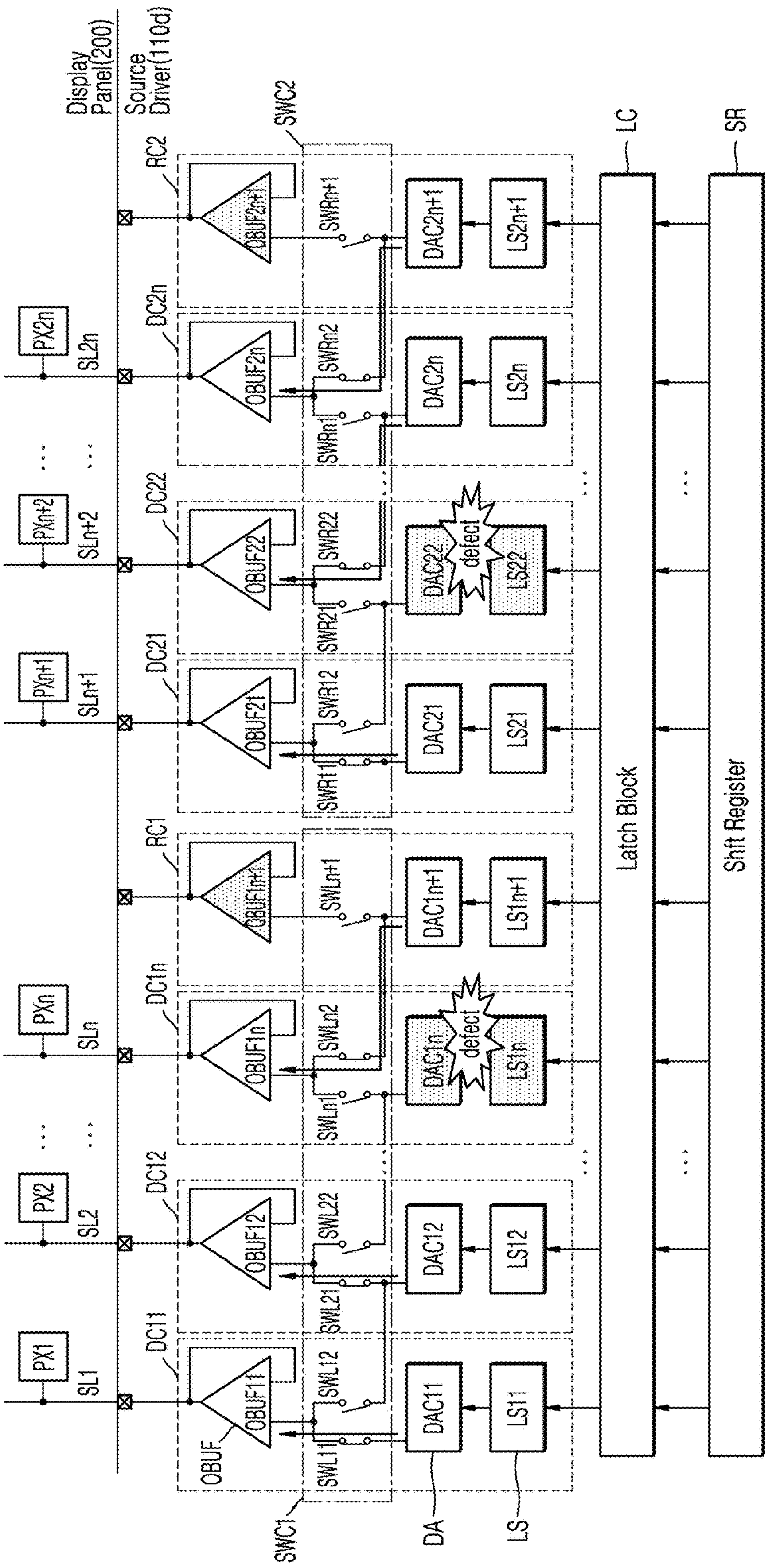

FIG. 11 illustrates a source driver 110*d* according to some example embodiments. FIGS. 12A and 12B illustrate repair operations of the source driver 110*d* according to some example embodiments. The source driver 110*d* may be applied to the source driver 110 of FIG. 1A and the source driver 110' of FIG. 1B. The source driver 110*d* is a modified example of the source driver 110*a* of FIG. 2, and thus, the description of the source driver 110*a* of FIG. 2 may be applied to the present embodiment.

Referring to FIG. 11, the source driver 110*d* may include a plurality of driving channels, for example, the driving channels DC11 to DC1*n* and DC21 to DC2*n*, a plurality of repair channels, for example, the first and second repair channels RC1 and RC2, and a plurality of switching circuits, for example, first and second switching circuits SWC1 and SWC2, the latch block LC, and the shift register SR.

In some example embodiments, the first repair channel RC1 may be disposed on one side of the driving channels DC11 to DC1*n* (e.g., side in a first direction), the second repair channel RC2 may be disposed on one side of the driving channels DC21 to DC2*n*, and a repair operation of replacing the defected driving channel by a repair channel may be performed in units of n driving channels.

The first switching circuit SWC1 may be disposed between the plurality of DACs DAC11 to DAC1*n*+1 and the plurality of output buffers OBUF11 to OBUF1*n*+1 in the driving channels DC11 to DC1*n* and the first repair channel RC1. The first switching circuit SWC1 may include a plurality of switches SWL11 to SWLn1, SWL12 to SWLn2, and SWLn+1 disposed between the DAC DA and the output buffer OBUF in the driving channels DC11 to DC1*n* and the first repair channel RC1.

Each of the plurality of switches SWL11 to SWLn1, SWL12 to SWLn2, and SWLn+1 of the first switching circuit SWC1 may be turned on or off in response to a corresponding switching signal among a plurality of first normal mode switching signals NMS1[1:n+1] and a plurality of first repair mode switching signals RMS1[1:n]. The switches SWL11 to SWLn1 and SWLn+1 are normal mode switches, and each of the switches SWL11 to SWLn1 and SWLn+1 may be turned on in response to an on level of the corresponding switching signal among the plurality of first normal mode switching signals NMS1[1:n+1]. The switches SWL12 to SWLn2 are repair mode switches, and each of the switches SWL12 to SWLn2 may be turned on in response to an on level of the corresponding switching signal among the plurality of first repair mode switching signals RMS1[1:n].

The second switching circuit SWC2 may be disposed between the plurality of DACs DAC21 to DAC2*n*+1 and the plurality of output buffers OBUF21 to OBUF2*n*+1 in the driving channels DC21 to DC2*n* and the second repair channel RC2. The second switching circuit SWC2 may include a plurality of switches SWR11 to SWRn1, SWR12 to SWRn2, and SWRn+1 disposed between the DAC DA and the output buffer OBUF in the driving channels DC21 to DC2*n* and the second repair channel RC2.

Each of the plurality of switches SWR11 to SWRn1, SWR12 to SWRn2, and SWRn+1 of the second switching circuit SWC2 may be turned on or off in response to a corresponding switching signal among a plurality of second normal mode switching signals NMS2[1:n+1] and a plurality of second repair mode switching signals RMS2[1:n]. The switches SWR11 to SWRn1 and SWRn+1 of the second switching circuit SWC2 are normal mode switches, and each of the switches SWR11 to SWRn1 and SWRn+1 may be turned on in response to an on level of the corresponding switching signal among the plurality of second normal mode switching signals NMS2[1:n+1]. The switches SWR12 to SWRn2 are repair mode switches, and each of the switches SWR12 to SWRn2 may be turned on in response to an on level of the corresponding switching signal among a plurality of second repair mode switching signals RMS2[1:n].

When no defect occurs in the plurality of driving channels DC11 to DC1*n* and DC21 to DC2*n*, the source driver 110*d* may operate in the normal mode. The driving channels DC11 to DC1*n* and DC21 to DC2*n* may be activated and operate, and the first and second repair channels RC1 and RC2 may be deactivated.

Referring to FIGS. 12A and 12B, when a defect occurs in any one of the plurality of driving channels DC11 to DC1*n* and DC21 to DC2*n*, the source driver 110*d* may operate in the repair mode.

In FIG. 12A, for example, it is assumed that a defect has occurred in the driving channel DC22. For example, it is assumed that a defect has occurred in the level shifter LS22 or the DAC DAC22 of the driving channel DC22.

Because no defect occurs in the driving channels DC11 to DC1*n* in which the repair operation is controlled by the first switching circuit SWC1, the driving channels DC11 to DC1*n* and the first repair channel RC1 may operate in the normal mode. The driving channels DC11 to DC1*n* may be activated and operate, and the first repair channel RC1 may be deactivated. The switches SWL11 to SWLn1 of the first switching circuit SWC1 may be turned on, and the switches SWL12 to SWLn2 may be turned off. The switch SWLn+1 may be turned off. The switch SWLn+1 may always be turned off in the repair mode and the normal mode. However, the inventive concept is not limited thereto, and the switch SWLn+1 may also be turned on in the normal mode.

In each of the driving channels DC11 to DC1*n*, a grayscale voltage output from the DAC DA may be provided to the output buffer OBUF. Each of the output buffers OBUF11 to OBUF1*n* may buffer the received grayscale voltage and output the grayscale voltage as a pixel signal. The output buffers OBUF11 to OBUF In may output n grayscale voltages to the first to nth source lines SL1 to SLn.

Because a defect has occurred in the driving channel DC22 among the driving channels DC21 to DC2*n* in which the repair operation is controlled by the second switching circuit SWC2, the driving channels DC21 to DC2*n* and the second repair channel RC2 may operate in the repair mode. The driving channels DC21 and DC23 (not shown) to DC2*n* may be activated and operate, and a part of the second repair channel RC2, for example, the level shifter LS2*n*+1 and the DAC DAC2*n*+1, may be activated and operate. Another part of the second repair channel RC2, for example, the output buffer OBUF2*n*+1, may be deactivated. In the second repair channel RC2, the driving channel DC22 may be partially deactivated. The level shifter LS22 and the DAC DAC22 of the driving channel DC22 may be deactivated, and the output buffer OBUF22 may be activated and operate.

The switch SWR11 disposed between the DAC 21 and the output buffer OBUF21 of the driving channel DC21 may be turned on, and the switches SWR21 to SWRn+1 disposed between the DACs DAC22 to DAC2*n*+1 and the output buffers OBUF22 to OBUF2n+1 in the driving channels DC22 to DC2n and the second repair channel RC2 may be turned off. The switch SWR12 disposed between the DAC DAC22 of the driving channel DC22 and the output buffer OBUF21 of the driving channel DC21 may be turned off, and the switches SWR22 to SWRn2 disposed between the DACs DAC23 to DAC2n+1 of the driving channels DC23 to DC2n and the second repair channel RC2, and the output buffers OBUF22 to OBUF2n of the driving channels DC22 to DC2n may be turned on.

The grayscale voltage output from the DAC DAC21 of the driving channel DC21 may be provided to the output buffer OBUF21 of the driving channel DC21, and grayscale voltages output from the DACs DAC23 to DAC2n+1 of the driving channels DC23 to DC2n and the second repair channel RC2 may be provided to the output buffers OBUF22 to OBUF2n of the driving channels DC22 to DC2n. Accordingly, n grayscale voltages output from the DACs DAC21 and DAC23 to DAC2n+1 of the driving channels DC21, the driving channels DC23 to DC2n, and the second repair channel RC2 may be provided to the output buffers OBUF21 to OBUF2n of the driving channels DC21 to DC2n.

Each of the output buffers OBUF21 to OBUF2n may buffer the received grayscale voltage and output the grayscale voltage as a pixel signal. The output buffers OBUF21 to OBUF2n may output the n grayscale voltages to (n+1)th to 2nth source lines SLn+1 to SL2n.

In FIG. 12B, for example, it is assumed that a defect occurs in the driving channels DC1n and DC22.

Because a defect has occurred in one of the driving channels DC11 to DC1n in which the repair operation is controlled by the first switching circuit SWC1 and one of the driving channels DC21 to DC2n in which the repair operation is controlled by the second switching circuit SWC2, the driving channels DC11 to DC1n and the first repair channel RC1 may operate in the repair mode, and the driving channels DC21 to DC2n and the second repair channel RC2 may also operate in the repair mode.

The driving channels DC11 to DC1n-1 may be activated and operate, a part of the first repair channel RC1 may be activated and operate, and a part of the defected driving channel DC1n may be deactivated. The level shifter LS1n+1 and the DAC DAC1n+1 of the first repair channel RC1 may be activated and operate, and the output buffer OBUF1n+1 may be deactivated. The first repair channel RC1 may be entirely deactivated in the normal mode, and the level shifter LS1n+1 and the DAC DAC1n+1 may be activated and operate in the repair mode. The level shifter LS1n and the DAC DAC1n of the defected driving channel DC1n may be deactivated, and the output buffer OBUF1n may be activated and operate.

Among the plurality of switches SWL11 to SWLn1, SWL12 to SWLn2, and SWLn+1 of the first switching circuit SWC1, the switches SWL11 to SWL1n−1 disposed between the DACs DAC11 to DAC1n−1 and the output buffers OBUF11 to OBUF1n−1 of the driving channels DC11 to DC1n−1 may be turned on, and the switches SWL1 and SWL1n−1 disposed between the DACs DAC1n and DAC1n+1 and the output buffers OBUF1n and OBUF1n+1 of the driving channel DC1n and the first repair channel RC1 may be turned off. The switches SWL12 to SWLn−12 (not shown) disposed between the DACs DAC12 to DAC1n of the driving channels DC12 to DC1n and the output buffers OBUF11 to OBUF1n−1 of the driving channels DC11 to DC1n−1 may be turned off, and the switch SWLn2 disposed between the DAC DAC1n+1 of the first repair channel RC1 and the output buffer OBUF1n of the driving channel DC1n may be turned on.

The grayscale voltages output from the DACs DAC11 to DAC1n−1 of the driving channels DC11 to DC1n−1 may be provided to the output buffers OBUF11 to OBUF1n−1 of the driving channels DC11 to DC1n−1, and the grayscale voltages output from the DAC DAC1n+1 of the first repair channel RC1 may be provided to the output buffer OBUF1n of the driving channel DC1n. Accordingly, the n grayscale voltages output from the DACs DAC11 to DAC1n−1 and DAC1n+1 of the driving channels DC11 to DC1n−1 and the first repair channel RC1 may be provided to the output buffers OBUF11 to OBUF1n of the driving channels DC11 to DC1n.

Each of the output buffers OBUF11 to OBUF1n may buffer the received grayscale voltage and output the grayscale voltage as a pixel signal. The output buffers OBUF11 to OBUF1n may output the n grayscale voltages to the first to nth source lines SL1 to SLn.

The repair operation of the driving channels DC21 to DC2n and the second repair channel RC2 when a defect has occurred in the driving channel DC22 among the driving channels DC21 to DC2n has been described with reference to FIG. 12A, and thus, a redundant description thereof will be omitted.

As described above, the source driver 110d according to the present embodiment may include a plurality of repair channels disposed for every n driving channels, for example, the first repair channel RC1 and the second repair channel RC2, and the repair operation may be performed in units of n driving channels.

Figure 13:
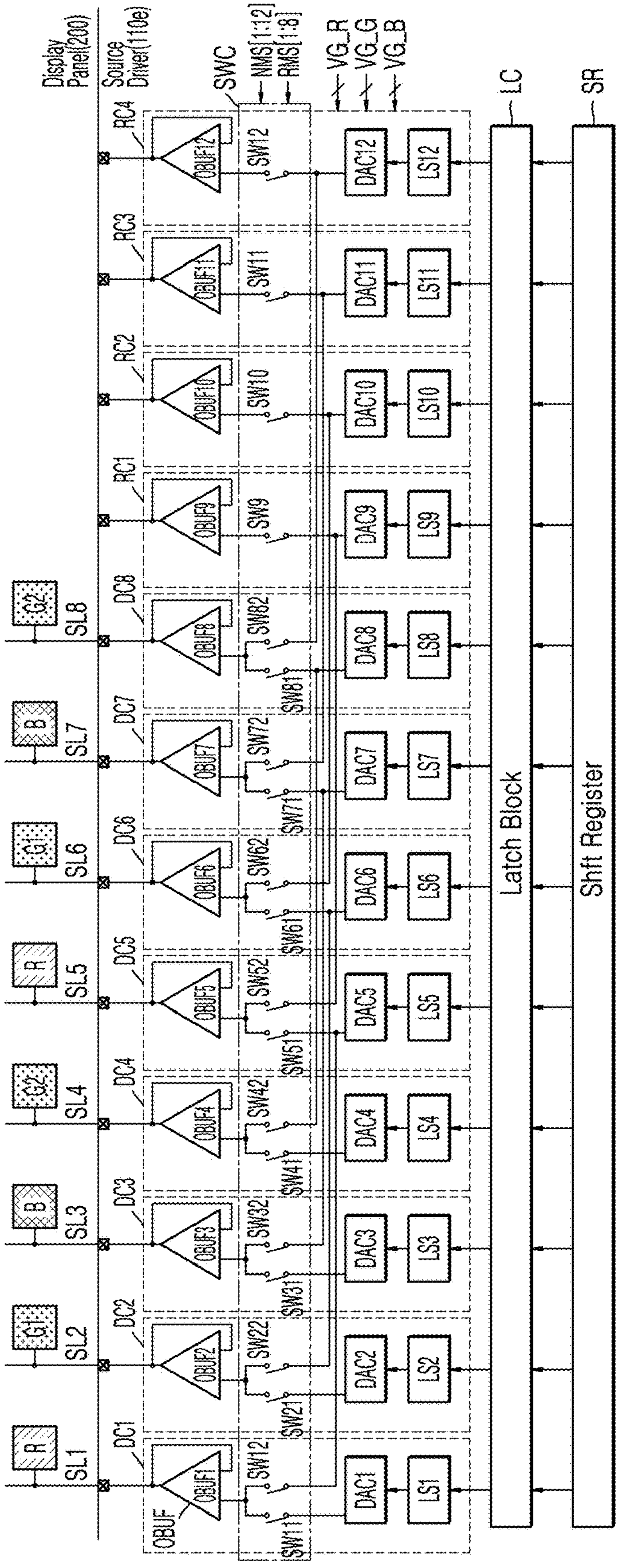
FIG. 13 illustrates a source driver according to some example embodiments.

FIG. 13 illustrates a source driver 110e according to some example embodiments.

Referring to FIG. 13, the source driver 100e may include a plurality of driving channels, for example, the first to eighth driving channels DC1 to DC8, a plurality of repair channels, for example, first to fourth repair channels RC1 to RC4, the switching circuit SWC, the latch block LC, and the shift register SR. The first to fourth repair channels RC1 to RC4 may be disposed on one side (e.g., a side in a first direction) of the first to eighth driving channels DC1 to DC8. The source driver 100e includes the eight driving channels DC1 to DC8 for convenience of description in some example embodiments, but the source driver 100e may include more or fewer driving channels. The number of repair channels may be more than or less than four; example embodiments are not limited thereto.

The display panel 200 may have a pentile structure in which a red pixel R, two green pixels G1 and G2, and a blue pixel B constitute one unit pixel, and the unit pixel is repeatedly disposed.

The first to eighth driving channels DC to DC8 may be divided into red driving channels driving source lines (e.g., the first source line SL1 and the fifth source line SL5) to which the red pixel R is connected, green driving channels driving source lines (e.g., the second source line SL2, the fourth source line SL4, the sixth source line SL6, and the eighth source line SL8) to which the green pixels G1 and G2 are connected, and blue driving channels driving source lines (e.g., the third source line SL3 and the seventh source line SL7) to which the blue pixel B is connected. The first and fifth driving channels DC1 and DC5 may be red driving channels, the second, fourth, sixth, and eighth driving channels DC2, DC4, DC6, and DC8 may be green driving channels, and the third and seventh driving channels DC3 and DC7 may be blue driving channels.

The first and fifth DACs DAC1 and DAC5 provided in the red driving channels, for example, the first and fifth driving channels DC1 and DC5, may receive a plurality of red grayscale voltages VG_R corresponding to a red color and output grayscale voltages corresponding to received pixel data among the plurality of red grayscale voltages VG_R.

The second, fourth, sixth, and eighth DACs DAC2, DAC4, DAC6, and DAC8 provided in the green driving channels, for example, the second, fourth, sixth, and eighth driving channels DC2, DC4, DC6, and DC8, may receive a plurality of green grayscale voltages VG_G corresponding to a green color and output grayscale voltages corresponding to received pixel data among the plurality of green grayscale voltages VG_G.

The third and seventh DACs DAC3 and DAC7 provided in the blue driving channels, for example, the third and seventh driving channels DC3 and DC7, may receive a plurality of blue grayscale voltages VG_B corresponding to a blue color and output grayscale voltages corresponding to received pixel data among the plurality of blue grayscale voltages VG_B.

As the grayscale voltages corresponding to different colors are applied to the red driving channels, the green driving channels, and the blue driving channels, a repair operation may be performed for each of the plurality of red driving channels, the plurality of green driving channels, and the plurality of blue driving channels.

The switching circuit SWC may include the plurality of first switches SW11 to SW81, SW9, SW10, SW11, and SW12 and the plurality of second switches SW12 to SW82. Each of the plurality of first switches SW11 to SW81, SW9, SW10, SW11, and SW12 may be turned on in response to an on level of a corresponding switching signal among a plurality of normal mode switching signals NMS[1:12] and connect the DAC DA to the output buffer OBUF in the same driving channel. In some example embodiments, the ninth to twelfth normal mode switching signals NMS[9:12] may each have a fixed value at an off level in a normal mode and a repair mode, and the ninth to twelfth switches SW9 to SW12 respectively provided in the first to fourth repair channels RC1 to RC4 may be turned off in the normal mode and the repair mode in response to the ninth to twelfth normal mode switching signals NMS[9:12] of the off level.

Each of the plurality of second switches SW12 to SW82 may be turned on in response to an on level of a corresponding switching signal among a plurality of repair mode switching signals RMS[1:8] and connect the DAC DA to the output buffer OBUF in adjacent driving channels corresponding to the same color. For example, the switch SW12 may be turned on and connect the first output buffer OBUF1 of the first driving channel DC1 corresponding to the red driving channel to the fifth DAC DAC5 of the fifth driving channel DC5. When the switch SW12 is turned on in the repair mode, the grayscale voltage output from the fifth DAC DAC5 may be provided to the first output buffer OBUF1.

In the repair mode, the first repair channel RC1 may be connected to an adjacent red driving channel through the switch SW52, and may be used for repair of the red driving channel in which a defect has occurred during a repair operation of the red driving channel. The second repair channel RC2 may be connected to an adjacent first green driving channel through the switch SW62, and may be used for repair of the first green driving channel in which a defect has occurred during a repair operation of the green driving channel. The third repair channel RC3 may be connected to an adjacent blue driving channel through the switch SW72, and may be used for repair of the blue driving channel in which a defect has occurred during a repair operation of the blue driving channel. The fourth repair channel RC4 may be connected to an adjacent second green driving channel through the switch SW82, and may be used for repair of the second green driving channel in which a defect has occurred during a repair operation of the second green driving channel For example, when a defect occurs in the fourth driving channel DC4 (second green driving channel) connected to the fourth source line SL4, the fourth driving channel DC4, the eighth driving channel DC8, and the fourth repair channel RC4 may operate in the repair mode. The switches SW41, SW81, and SW12 may be turned off, and the switches SW42 and SW82 may be turned on. A part of the eighth driving channel DC8 may replace a part of the fourth driving channel DC4 (a part where a defect has occurred), and the fourth repair channel RC4 may replace a part of the eighth driving channel DC8.

Because no defect occurs in the red driving channels DC1 and DC5, the first green driving channels DC2 and DC6, and the blue driving channels DC3 and DC7, the red driving channels DC1 and DC5, the first green driving channels DC2 and DC6, the blue driving channels DC3 and DC7, and the first to third repair channels RC1 to RC3 may operate in the normal mode. The switches SW11, SW21, SW31, SW51, SW61, and SW71 may be turned on, and the switches SW12, SW22, SW32, SW52, SW62, and SW72 may be turned off. As described above, the ninth to twelfth switches SW9 to SW12 may be turned off in the normal mode. However, the inventive concept is not limited thereto, and in some example embodiments, the ninth to twelfth switches SW9 to SW12 may be turned on in the normal mode.

Figure 14:
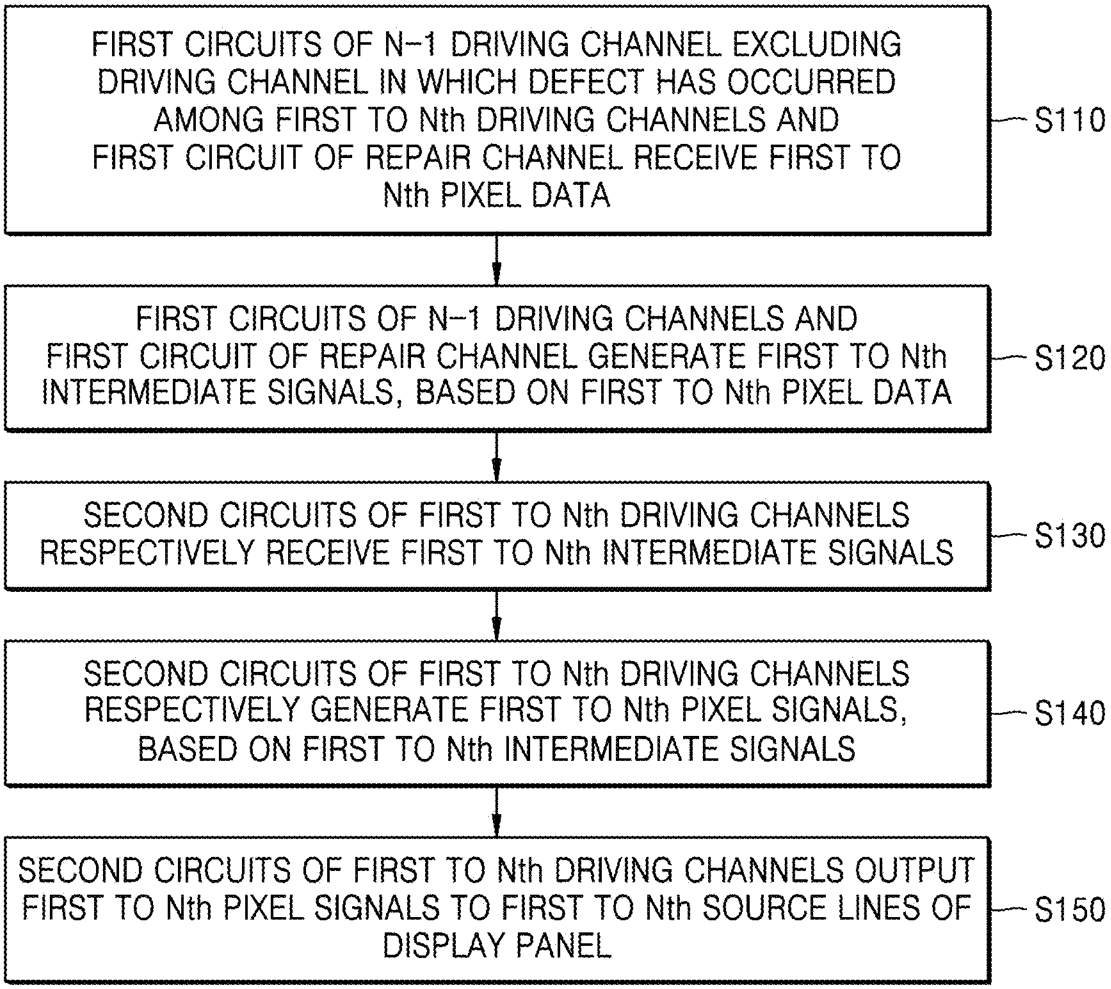
FIG. 14 illustrates a repair operation of a source driver according to some example embodiments.

FIG. 14 illustrates a repair operation of a source driver according to some example embodiments. The repair operation in FIG. 14 may be performed in the source drivers (110, 110', 110*a*, 110*b*, 110*c*, 110*d*, and 110*c*) in FIGS. 1A, 1B, 2, 5, 9, 11, and 13.

Referring to FIG. 14, first circuits of n−1 driving channels excluding a defected driving channel among first to nth driving channels and a first circuit of a repair channel may receive first to nth pixel data (S110). Each of the first to nth driving channels and the repair channel may include a level shifter, a DAC, and a driving channel, and in some example embodiments, the first circuit may include the level shifter and the DAC. In some example embodiments, the first circuit may include the level shifter, the DAC, and an input stage of an output buffer. In some example embodiments, the first circuit may include the level shifter.

The first circuits of n−1 driving channels and the first circuit of the repair channel may generate first to nth intermediate signals based on the first to nth pixel data (S120). When the first circuit includes the level shifter and the DAC, the intermediate signal may be a grayscale voltage. When the first circuit includes the level shifter, the DAC, and the input stage of the output buffer, the intermediate signal may be one or more signals output from the input stage according to the grayscale voltage. When the first circuit includes the level shifter, the intermediate signal may be pixel data of which level is shifted.

Second circuits of the first to nth driving channels may receive the first to nth intermediate signals, respectively (S130). As the switching circuit disposed between the first and second circuits of the first to nth driving channels and the repair channel changes signal transmission paths of the first to nth driving channels and the repair channel, the second circuits of the first to nth driving channels may receive the first to nth intermediate signals generated in the n−1 driving channels excluding the defected driving channel among the first to nth driving channels and the repair channel.

When the first circuit includes the level shifter and the DAC, the second circuit may be an output buffer. When the first circuit includes the level shifter, the DAC, and the input stage of the output buffer, the second circuit may be the output stage of the output buffer. When the first circuit includes the level shifter, the second circuit may include the DAC and the output buffer.

The second circuits of the first to nth driving channels may respectively generate first to nth pixel signals based on the first to nth intermediate signals (S140). When the second circuit is the output buffer, the output buffer may receive the grayscale voltage as an intermediate signal and generate a pixel signal based on the grayscale voltage. When the second circuit is the output stage of the output buffer, the output stage may receive one or more signals output from an input stage of the same output buffer or an adjacent output buffer as an intermediate signal and generate the pixel signal based on the received intermediate signal. When the second circuit includes the DAC and the output buffer, the DAC may select the grayscale voltage based on the pixel data of which level is shifted, the output buffer may buffer the selected grayscale voltage, and generate the grayscale voltage as the pixel signal.

The second circuits of the first to nth driving channels may output the first to nth pixel signals to first to nth source lines of a display panel (S150). First to nth output buffers of the first to nth driving channels may output the first to nth pixel signals to the first to nth source lines of the display panel.

Various operations described with reference to FIG. 14 are not necessarily performed in the order listed, nor are the operations necessarily performed concurrently. For example, one or more of operations S110 to S150 may be performed concurrently or at least partially concurrent and/or iteratively; example embodiments are not limited thereto.

Figure 15:
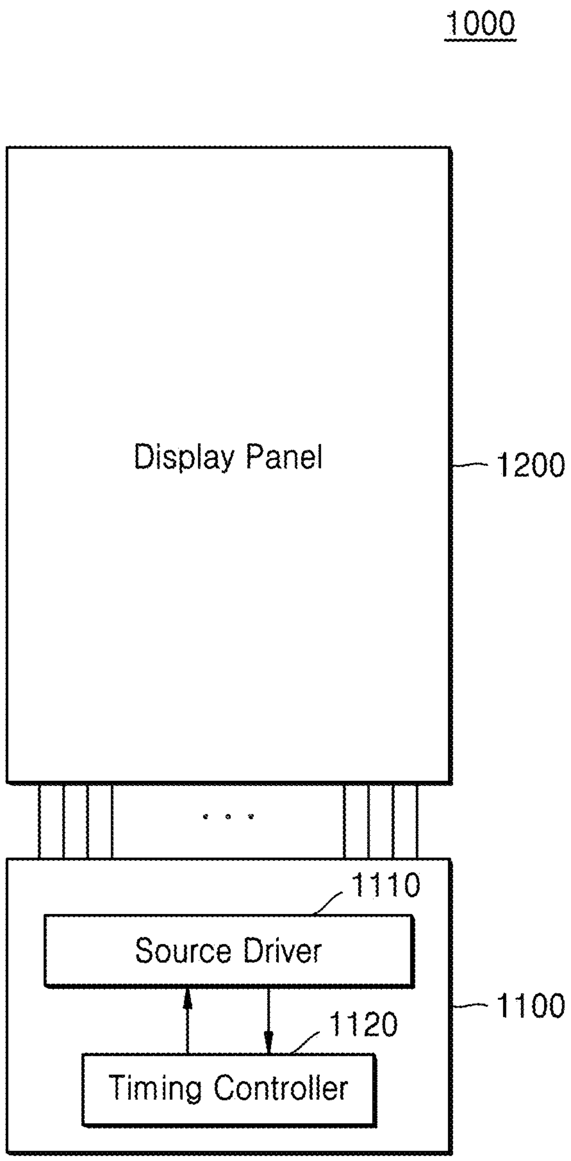
FIG. 15 illustrates an implementation example of a display device according to some example embodiments.

FIG. 15 illustrates an implementation example of a display device 1000 according to some example embodiments. The display device 1000 of FIG. 15 is a device including a small display panel 1200, and may be applied to, for example, a mobile device such as a smartphone or a tablet PC.

Referring to FIG. 15, the display device 1000 may include a display driving circuit 1100 and the display panel 1200. The display driving circuit 1100 may include one or more ICs, mounted on a circuit film such as a tape carrier package (ICP), a chip on film (COF), a flexible print circuit (FPC), etc., attached to the display panel 1200 through a tape automatic bonding (TAB) method, or mounted on a non-display area of the display panel 1200 (e.g., an area where an image is not displayed) through a chip on glass (COG) method.

The display driving circuit 1100 may include a source driver 1110 and a timing controller 1120, and may further include a gate driver. In some example embodiments, the gate driver may be mounted on the display panel 1200.

As described above with reference to FIGS. 1 to 14, the source driver 1110 may include a plurality of driving channels and a repair channel, and perform a repair operation on a defected driving channel by using the repair channel when a defect occurs in at least one of the plurality of driving channels. The repair operation may be performed before an output stage of an output buffer provided in each of the plurality of driving channels and the repair channel by switches disposed before the output stage. Accordingly, a vertical defect phenomenon occurring on the display panel 1200 may be removed, and a market defect rate due to a progressive defect may be reduced. In addition, an increase in the size of the source driver 1110 according to a circuit added for repair may be reduced.

Figure 16:
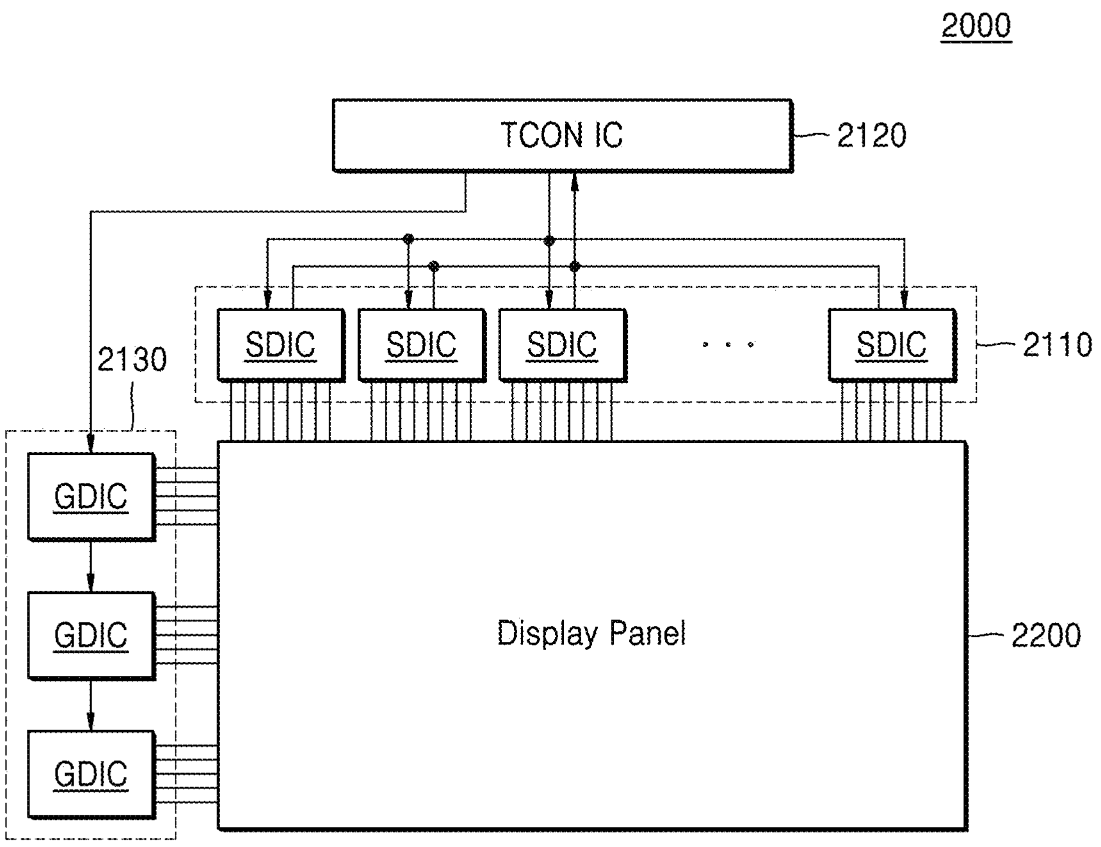
FIG. 16 illustrates an implementation example of a display device according to some example embodiments.

FIG. 16 illustrates an implementation example of a display device 2000 according to some example embodiments. The display device 2000 of FIG. 16 is a device including a medium and large-sized display panel 2200, and may be applied to, for example, a television, a monitor, etc.

Referring to FIG. 16, the display device 2000 may include a source driver 2110, a timing controller 2120, a gate driver 2130, and the display panel 2200.

The timing controller 2120 may include one or more ICs or modules. The timing controller 2120 may communicate with a plurality of source driving ICs SDIC and a plurality of gate driving ICs GDIC through a set interface.

The timing controller 2120 may generate control signals for controlling the driving timing of a plurality of data driving ICs DDIC and the plurality of gate driving ICs GDIC, and may provide the control signals to the plurality of data driving ICs DDIC and the plurality of gate driving ICs GDIC.

The source driver 2110 includes the plurality of source driving ICs SDIC, and the plurality of source driving ICs SDIC may be mounted on a circuit film such as a TCP, a COF, a FPC, etc., attached to the display panel 2200 through a TAB method, or mounted on a non-display area of the display panel 2200 through a COG method.

The gate driver 2130 includes the plurality of gate driving ICs GDIC, and the plurality of gate driving ICs GDIC may be mounted on the circuit film and attached to the display panel 2200 through the TAB method, or mounted on the non-display area of the display panel 2200 through the COG method. Alternatively, the gate driver 2130 may be directly formed on a lower substrate of the display panel 2200 through a gate-driver in panel (GIP) method. The gate driver 2130 may be formed in the non-display area outside a pixel array in which pixels PX are formed in the display panel 2200, and may be formed by the same TFT process as the pixels PX.

Each of the plurality of source driving ICs SDIC may include a plurality of driving channels and a repair channel, as described above with reference to FIGS. 1 to 14, and perform a repair operation on a driving channel in which a defect has occurred by using the repair channel when a defect occurs in at least one of the plurality of driving channels. The repair operation may be performed before an output stage of an output buffer provided in each of the plurality of driving channels and the repair channel by switches disposed before the output stage. Accordingly, a vertical defect phenomenon occurring on the display panel 2200 may be removed, and a market defect rate due to a progressive defect may be reduced. In addition, an increase in the size of the plurality of source driving ICs SDIC according to a circuit added for repair may be reduced.

Figure 17:
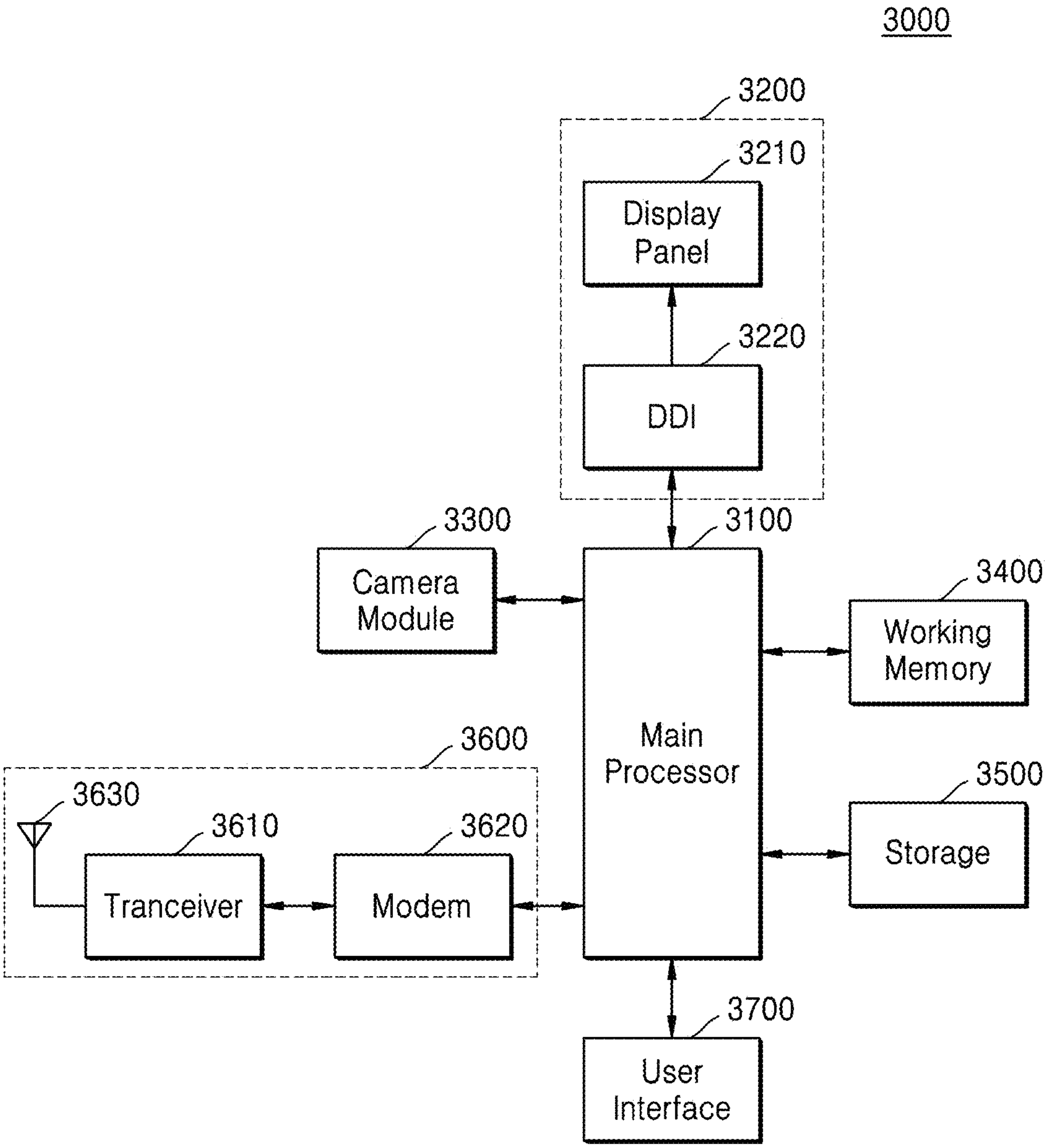
FIG. 17 illustrates an electronic device including a display device according to some example embodiments.

FIG. 17 illustrates an electronic device 3000 including a display device 3200 according to some example embodiments.

FIG. 17 is a block diagram illustrating the electronic device 3000 including the display device 3200 according to some example embodiments. The electronic device 3000 of FIG. 17 may be a portable terminal.

Referring to FIG. 17, the electronic device 3000 may include a main processor 3100 (e.g., an application processor), the display device 3200, a camera module 3300, a working memory 3400, a storage 3500, a wireless transceiver 3600, and a user interface 3700.

The main processor 3100 may be implemented as a system on chip (SoC) that controls overall operations of the electronic device 3000 and drives an application program, an operating system, etc. The main processor 3100 may provide image data provided from the camera module 3300 or image data stored in the storage 3500 device to the display device 3200. The main processor 3100 may store the image data provided from the camera module 3300 in the storage device 3500.

The display device 3200 may include a DDI 3220 and a display panel 3210. The display driving circuit 100 described with reference to FIG. 1A may be applied to the DDI 3220. As described above with reference to FIGS. 1 to 14, a source driver of the DDI 3220 may include a plurality of driving channels and a repair channel, and perform a repair operation on a driving channel in which a defect has occurred by using the repair channel when a defect occurs in at least one of the plurality of driving channels. The repair operation may be performed before an output stage of an output buffer provided in each of the plurality of driving channels and the repair channel by switches disposed before the output stage. Accordingly, a vertical defect phenomenon occurring on the display panel 3210 may be removed, and a market defect rate due to a progressive defect may be reduced. In addition, an increase in the size of the DDI 3220 according to a circuit added to the source driver for repair may be reduced.

The camera module 3300 may include one or more image sensors. The camera module 3300 may photograph an external object to generate image data and provide the image data to the main processor 3100.

The working memory 3400 may be implemented as a volatile memory such as one or more of dynamic random access memory (DRAM), static RAM (SRMA), or a non-volatile resistive memory such as Ferroelectric RAM (FeRAM), Resistive RAM (RRAM), and phase-change RAM (PRAM). The working memory 3400 may store programs and/or data processed or executed by the main processor 3100.

The storage 3500 may be implemented as a non-volatile memory device such as a NAND flash or a resistive memory, and, for example, the storage 3500 may be provided as a memory card such as a multi-media card (MMC), an embedded MMC (eMMC), and a secure digital (SD) card, or micro SD card. The storage 3500 may store the image data provided from the camera module 3300 or image data received through the wireless transceiver 3600.

The wireless transceiver 3600 may include a transceiver 3610, a modem 3620, and an antenna 3630. The wireless transceiver 3600 may receive data or transmit data through wireless communication with an external device.

The user interface 3700 may be implemented as various devices capable of receiving a user input such as a keyboard, a curtain key panel, a touch panel, a fingerprint sensor, a microphone, etc. The user interface 3700 may receive the user input and provide a signal corresponding to the received user input to the main processor 3100.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While some example embodiments have been particularly shown and described with reference to embodiments thereof, it will be understood that various changes in form and details may be made therein without departing from the spirit and scope of the following claims. Furthermore, example embodiments are not necessarily mutually exclusive with one another. For example, some example embodiments may include one or more features described with reference to one or more figures, and may also include one or more other features described with reference to one or more other figures.

What is claimed is:

1. A source driver comprising:

a plurality of driving channels configured to generate a plurality of pixel signals respectively provided to a plurality of source lines of a display panel, each of the plurality of driving channels comprising a first circuit and a second circuit, the first circuit configured to generate a first signal based on received pixel data, and the second circuit configured to generate a pixel signal, based on the first signal;

a repair channel comprising another first circuit and another second circuit; and a switching circuit configured to, based on a defect occurring in one of the plurality of driving channels, change a plurality of signal transmission paths of the plurality of driving channels and to change an internal signal transmission path of the repair channel so as to repair the first circuit of a defected driving channel among the plurality of driving channels by using the first circuit of the repair channel, the defected driving channel being a channel in which the defect has occurred, wherein the switching circuit includes a plurality of switches, wherein at least one of the plurality of switches is between the repair channel and a first driving channel, among the plurality of driving channels, that is not adjacent to the repair channel, wherein the at least one of the plurality of switches is configured to provide a direct electrical connection between the repair channel and the first driving channel.

2. The source driver of claim 1, wherein each of the plurality of driving channels and the repair channel includes:

a level shifter configured to shift a level of received pixel data;

a digital-to-analog conversion (DAC) circuit configured to receive the pixel data of which the level is shifted and to output a grayscale voltage corresponding to the pixel data of which the level is shifted; and an output buffer configured to buffer the grayscale voltage and output the grayscale voltage as the pixel signal.

3. The source driver of claim 2, wherein the first circuit includes the level shifter and the DAC circuit, and the second circuit includes the output buffer.

4. The source driver of claim 3, wherein the plurality of switches are between the DAC circuits and the output buffers of the plurality of driving channels and the repair channel.

5. The source driver of claim 4, wherein the level shifter and the DAC circuit of the defected driving channel are configured to be deactivated, the output buffer of the defected driving channel is configured to be activated, and the level shifter and the DAC circuit of the repair channel are configured to be activated.

6. The source driver of claim 4, wherein the switching circuit is configured to provide an output signal of the DAC circuit of a driving channel adjacent in a first direction to the defected driving channel, the providing the output signal of the DAC circuit of the driving channel to the output buffer of the defected driving channel, the providing the output signal of the DAC circuit of the driving channel as an input signal and provide an output signal of the DAC circuit of the repair channel as an input signal of the output buffer of a driving channel adjacent in a second direction to the repair channel among the plurality of driving channels, wherein the second direction is opposite to the first direction.

7. The source driver of claim 2, wherein the first circuit includes the level shifter, the DAC circuit, and an input stage of the output buffer, and the second circuit includes an output stage of the output buffer.

8. The source driver of claim 7, wherein the plurality of switches are between the input stage and the output stage of each of a plurality of output buffers of the plurality of driving channels and the repair channel, and wherein the switching circuit is configured to provide an output signal of the input stage of the output buffer of a driving channel adjacent in a first direction to the defected driving channel, to the output stage of the output buffer of the defected driving channel, and provide an output signal of the input stage of the output buffer of the repair channel to the output stage of the output buffer of a driving channel adjacent in a second direction to the repair channel among the plurality of driving channels, wherein the second direction is opposite to the first direction.

9. The source driver of claim 2, wherein the first circuit includes the level shifter, and the second circuit includes the DAC circuit and the output buffer.

10. The source driver of claim 9, wherein the plurality of switches are between the level shifters and the DAC circuits of the plurality of driving channels and the repair channel, and the switching circuit is configured to provide an output signal of the level shifter of a driving channel adjacent in a first direction to the defected driving channel, the providing the output signal of the level shifter of the driving channel to the DAC circuit of the defected driving channel, and provide an output signal of the level shifter of the repair channel to the DAC circuit of a driving channel adjacent in a second direction to the repair channel among the plurality of driving channels, wherein the second direction is opposite to the first direction.

11. A source driver comprising:

a plurality of driving channels each comprising a digital-to-analog conversion (DAC) circuit and an output buffer and configured to generate a plurality of data signals in a plurality of source lines of a display panel;

a repair channel comprising another DAC circuit and another output buffer; and a switching circuit configured to connect the plurality of driving channels to the repair channel such that, in response to a defect occurring in one of the plurality of driving channels, a plurality of grayscale voltages generated in driving channels other than a defected driving channel in which the defect has occurred and the repair channel are output as pixel signals through a plurality of output buffers of the plurality of driving channels, wherein the switching circuit includes a plurality of switches, wherein at least one of the plurality of switches is between the repair channel and a first driving channel, among the plurality of driving channels, that is not adjacent to the repair channel, wherein the at least one of the plurality of switches is configured to provide a direct electrical connection between the repair channel and the first driving channel.

12. The source driver of claim 11, wherein the switching circuit is configured to block connection between the plurality of driving channels and the repair channel such that the plurality of grayscale voltages generated in the plurality of driving channels are output as a plurality of pixel signals through the plurality of output buffers of the plurality of driving channels, in response to no defect occurring in the plurality of driving channels.

13. The source driver of claim 11, wherein the plurality of switches are between the DAC circuits and the output buffers of the plurality of driving channels and the repair channel.

14. The source driver of claim 11, wherein the DAC circuit of the defected driving channel is configured to be deactivated, the output buffer of the defected driving channel is configured to be activated, and the DAC circuit of the repair channel is configured to be activated.

15. The source driver of claim 11, wherein the DAC circuits in the plurality of driving channels are configured to output grayscale voltages corresponding to a same color.

16. A display driving circuit configured to drive a display panel, the display driving circuit comprising:

a source driver configured to generate a plurality of pixel signals based on image data, and to provide the plurality of pixel signals to a plurality of source lines of the display panel; and a gate driver configured to sequentially select a plurality of rows of the display panel by sequentially providing gate-on signals to a plurality of gate lines of the display panel, wherein the source driver comprises:

a plurality of driving channels each comprising a digital-to-analog conversion (DAC) circuit and an output buffer, the plurality of driving channels configured to generate the plurality of pixel signals;

a repair channel on one side of the plurality of driving channels and comprising a DAC circuit and an output buffer; and a switching circuit comprising a plurality of switches between the DAC circuits and the output buffers of the plurality of driving channels and the repair channel, and configured to perform a repair operation on a defected driving channel in which a defect has occurred among the plurality of driving channels, wherein the repair operation is performed according to a turn-on operation of at least one repair mode switch among the plurality of switches and a turn-off operation of at least one normal mode switch among the plurality of switches, wherein at least one of the plurality of switches is between the repair channel and a first driving channel, among the plurality of driving channels, that is not adjacent to the repair channel, wherein the at least one of the plurality of switches is configured to provide a direct electrical connection between the repair channel and the first driving channel.

17. The display driving circuit of claim 16, wherein in response to no defect occurring in the plurality of driving channels, repair mode switches among the plurality of switches are turned off, and normal mode switches among the plurality of switches are turned on, such that a plurality of grayscale voltages generated from the plurality of driving channels are output as a plurality of pixel signals through a plurality of output buffers of the plurality of driving channels.

18. The display driving circuit of claim 16, wherein the DAC circuit of the defected driving channel is deactivated, the output buffer of the defected driving channel is activated, and the DAC circuit of the repair channel is activated.

19. The display driving circuit of claim 16, wherein the switching circuit is configured to:

provide an output signal of the DAC circuit of a driving channel adjacent in a first direction to the defected driving channel, to the output buffer of the defected driving channel, as an input signal and provide an output signal of the DAC circuit of the repair channel as an input signal of the output buffer of a driving channel adjacent in a second direction to the repair channel among the plurality of driving channels, wherein the second direction is opposite to the first direction.

20. The display driving circuit of claim 16, wherein the plurality of driving channels include a plurality of first driving channels and a plurality of second driving channels, the repair channel includes a first repair channel disposed on one side of the plurality of first driving channels and a second repair channel disposed on one side of the plurality of second driving channels, and the switching circuit is configured to perform the repair operation on the plurality of first driving channels by using the first repair channel and on the plurality of second driving channels by using the second repair channel.

* * * * *